(12) United States Patent
Chan et al.

(10) Patent No.: US 11,103,974 B2
(45) Date of Patent: Aug. 31, 2021

(54) METHODS OF MEASURING AND GRINDING AN ICE BLADE, AND APPARATUSES USING SAME

(71) Applicant: Skatescribe Corporation, Toronto (CA)

(72) Inventors: Nathan Chan, Toronto (CA); Steve Martin, Toronto (CA); Jamie A. Gonzalez, Richmond Hill (CA); Emidio Di Pietro, Georgetown (CA); Tony Di Pietro, Brampton (CA)

(73) Assignee: Skatescribe Corporation, Toronto (CA)

(*) Notice: Subject to any disclaimer, the term of this patent is extended or adjusted under 35 U.S.C. 154(b) by 754 days.

(21) Appl. No.: 15/782,372

(22) Filed: Oct. 12, 2017

(65) Prior Publication Data

US 2018/0028898 A1 Feb. 1, 2018

Related U.S. Application Data

(63) Continuation of application No. PCT/CA2016/000147, filed on May 18, 2016.

(30) Foreign Application Priority Data

May 12, 2016 (CA) ................................ CA 2930079

(51) Int. Cl.
*B24B 3/00* (2006.01)
*B24B 49/02* (2006.01)
(Continued)

(52) U.S. Cl.
CPC ................ *B24B 49/02* (2013.01); *A63C 3/10* (2013.01); *B23Q 17/0909* (2013.01);
(Continued)

(58) Field of Classification Search
CPC ......... B24B 49/00; B24B 49/02; B24B 49/06; B24B 49/12; B24B 3/00; B24B 3/003;
(Continued)

(56) References Cited

U.S. PATENT DOCUMENTS 4,722,152 A * 2/1988 Ek ........................... B24B 49/00
451/5
5,009,039 A 4/1991 Lager et al.
(Continued)

FOREIGN PATENT DOCUMENTS

CA 2608176 A1 9/2003
CN 1030717 A 2/1989
(Continued)

OTHER PUBLICATIONS

Notification of Transmittal of the International Search Report and the Written Opinion of the International Searching Authority, or the Declaration, dated Jul. 27, 2016, 6 pages.
(Continued)

*Primary Examiner* — Eileen P Morgan
(74) *Attorney, Agent, or Firm* — Barley Snyder

(57) ABSTRACT

An automated apparatus for grinding an ice blade on an ice skate comprises a processor, an input device in communication with said processor, a skate holder, a non-contact measuring device in communication with said processor, and a grinding device in communication with said processor. The input device permits a user to select an ice blade grinding option. The skate holder releasably holds at least one said ice skate to said apparatus. The non-contact measuring device is configured to measure a three-dimensional (3D) shape of said ice blade. The grinding device is configured to perform a grinding action on said ice blade in said holder based on said selected ice blade grinding option to change said 3D shape of said ice blade to a desired 3D shape.

55 Claims, 12 Drawing Sheets

(51) Int. Cl.

| | | |
|---|---|---|
| *B24B 49/12* | (2006.01) | |
| *B24B 9/04* | (2006.01) | |
| *A63C 3/10* | (2006.01) | |
| *B23Q 17/20* | (2006.01) | |
| *G01B 21/20* | (2006.01) | |
| *G01B 11/25* | (2006.01) | |
| *B23Q 17/24* | (2006.01) | |
| *B23Q 17/09* | (2006.01) | |
| *B23Q 11/00* | (2006.01) | |
| *A63C 1/32* | (2006.01) | |

(52) U.S. Cl.
CPC ............ *B23Q 17/2471* (2013.01); *B24B 3/00* (2013.01); *B24B 3/003* (2013.01); *B24B 9/04* (2013.01); *B24B 49/12* (2013.01); *G01B 11/2518* (2013.01); *A63C 1/32* (2013.01); *B23Q 11/0046* (2013.01); *B23Q 17/20* (2013.01); *G01B 21/20* (2013.01)

(58) Field of Classification Search
CPC ........ B24B 9/04; B24D 15/06; B24D 15/066; A63C 3/10; B23Q 17/2471; B23Q 11/0046; G01B 21/20
USPC .................... 451/5, 6, 45, 54, 229, 234, 383
See application file for complete search history.

(56) References Cited

U.S. PATENT DOCUMENTS

| | | |
|---|---|---|
| 5,167,170 A | 12/1992 | Croteau |
| 6,955,584 B2 | 10/2005 | Giurgiuman et al. |
| 7,220,161 B2 | 5/2007 | Eriksson |
| 9,573,236 B2* | 2/2017 | Layton, Jr. ............ B24B 45/003 |
| 9,895,786 B2 | 2/2018 | Frommer et al. |
| 10,300,574 B2* | 5/2019 | Layton, Jr. ............. B24B 55/00 |
| 2011/0169233 A1 | 7/2011 | Wilson et al. |
| 2014/0179201 A1* | 6/2014 | Proulx ................. B24D 15/066 451/28 |
| 2017/0355056 A1* | 12/2017 | Layton, Jr. ............... A63C 1/42 |
| 2018/0126250 A1* | 5/2018 | Proulx ................ B24B 27/0675 |

FOREIGN PATENT DOCUMENTS

| | | |
|---|---|---|
| CN | 1565804 A | 1/2005 |
| CN | 102292191 A | 12/2011 |
| CN | 202522222 U | 11/2012 |
| DE | 20314680 U1 | 12/2003 |
| WO | 8900443 A1 | 1/1989 |
| WO | 03072206 A2 | 4/2003 |
| WO | 2007099526 A1 | 9/2007 |
| WO | 2012091670 A1 | 7/2012 |

OTHER PUBLICATIONS

Abstract of CN1565804, dated Jan. 19, 2005, 1 page.
International Preliminary Report on Patentability, dated May 30, 2017, 62 pages.
Extended European Search Report, European Patent Application No. 16795577.2, dated Jan. 24, 2019, 11 pages.
Chinese Notification of the First Office Action with English translation, Chinese Patent Application No. 201680041082.1, dated Mar. 5, 2019, 24 pages.
Abstract of CN 202522222U, dated Nov. 7, 2012, 2 pages.

* cited by examiner

METHODS OF MEASURING AND GRINDING AN ICE BLADE, AND APPARATUSES USING SAME

CROSS-REFERENCE TO RELATED APPLICATIONS

This application is a continuation of PCT International Application No. PCT/CA2016/000147, filed on May 18, 2016, which claims priority under 35 U.S.C. § 119 to U.S. Provisional Patent Application No. 62/163,557 filed on May 19, 2015.

FIELD OF THE INVENTION

The present invention relates generally to sharpening and shaping ice blades used in ice skates, luges, bobsleds and other winter sports equipment which run over ice and, more particularly, to an apparatus and method of grinding an ice blade, an ice blade measuring system and method of measuring an ice blade, and an ice blade grinding system and method of grinding an ice blade.

BACKGROUND

Ice skates have blades which typically may be formed from metal and which have a specific shape designed to facilitate skating. In modern ice hockey skates typically a single ice blade is located under each foot of the skater. The ice blades are usually affixed longitudinally under the skate boot portion and may have a generally convex curve side profile from front to back as well as a concave or grooved bottom face. Typically, only a portion of the ice blade of the skate touches the ice at any one time and, during skating, the ice blade is angled from side to side as well as rocked back and forth by the skater against the ice surface to propel the skater.

According to prevailing theories of the science behind ice skating, a skater is capable of skating on ice because: (a) the weight of the skater is focused in a narrow area of ice under the concave portion of the bottom or ice contacting surface of the ice blade, which creates enough pressure to form a thin film of water under the ice blade, and a skater glides on this film of water with a greatly reduced amount of friction; and (b) ice has a natural "quasi-fluid" layered region at its surface which creates a naturally slippery surface.

Although ice blades are made from metal and may be harder than the ice, the ice blades still exhibit wear over time. In addition, the ice blade shape may become modified over time by inexact sharpening processes, stepping on other hard surfaces, or by being bent, dented or damaged in collisions during play or even nicked when not being used. Such wear or modifications may change the ice blade shape and may result in a loss of performance. Consequently, there is a constant need for skate shaping and sharpening.

Ice blade shapes can vary according to activity; an ice blade on a figure skate will have a different shape than an ice blade on a hockey skate, which will also be different from an ice blade on a speed skate. Further, even within one sport, at present the different manufacturers of ice blades may provide their own unique factory or OEM blade shape. Even further, within one sport, and with equipment from the same manufacturer, ice blade shapes may be customized by the user to try to optimize performance—for example, some hockey players prefer the ice blades to be sharpened and shaped in a particular way to suit their style of play or even to suit their specific position. Sharpened ice blades are also used in other activities, such as luge, skeleton and bobsledding all of which may have specific ice blade shaping and sharpening requirements, which may vary according to the athlete, the design of their sleds, or even the set-up of the track or course.

Modification of the shape of ice blades, such as those on OEM hockey skates, can be accomplished today using manually-operating grinding machines or automatic grinding machines. However, the determination of which shape to apply for any given skater is unscientific, typically using fixed jigs, templates, guides, and the like. For hockey players in particular, there may be recommendations for certain sharpening and shaping parameters based on whether the player plays a forward position, a defensive position or a goalie position. Further modifications to the ice blade may be suggested by the player based on their own experience with shaping or sharpening and the results provided.

Current skate sharpening systems have a major shortcoming in that there is no meaningful feedback to the user of how the ice blade sharpening affects their performance. Essentially the user either adapts to the sharpening shape selected for the ice blade, or makes a random change to another shape profile hoping to find one that feels right. Ice blade shapes are often established using fixed jigs, templates or guides, which may not be readily customizable.

In the past, ice blade shaping and sharpening techniques have been developed on a largely trial and error basis. For example, at the highest levels of professional sports, a final edge for a specific ice blade may be put on by a special craftsman, such as a custom sharpener, who through repeated interactions with a user athlete gets to know the requirements and what configuration is preferred by the athlete. However, such custom hand crafted attention is both expensive and not very precise. Not only is it difficult for the user to determine if any particular shaping or sharpening was effective, because of the variation in shaping and sharpening from one instance to the next, even if it was effective it can be difficult to reliably repeat the results.

The only feedback from the athlete as to whether any change in the shape or sharpening technique has been positive or negative to their performance is their own observations, which are impressions only and may be affected by confirmation bias. The vast majority of ice blade users therefore rely on either a person or an automatic machine with a fixed guide to deliver a shaped and/or sharpened blade with little control over the final shaped and sharpened configuration. However, as in all sports, a small improvement can result in the difference between winning and losing, and an improved approach to customized blade shaping and sharpening is greatly desired.

SUMMARY

An automated apparatus for grinding an ice blade on an ice skate comprises a processor, an input device in communication with said processor, a skate holder, a non-contact measuring device in communication with said processor, and a grinding device in communication with said processor. The input device permits a user to select an ice blade grinding option. The skate holder releasably holds at least one said ice skate to said apparatus. The non-contact measuring device is configured to measure a three-dimensional (3D) shape of said ice blade. The grinding device is configured to perform a grinding action on said ice blade in said holder based on said selected ice blade grinding option to change said 3D shape of said ice blade to a desired 3D shape.

BRIEF DESCRIPTION OF THE DRAWINGS

The invention will now be described by way of example with reference to the accompanying figures, of which.

DETAILED DESCRIPTION OF THE EMBODIMENTS

The present invention is described in more detail with reference to exemplary embodiments thereof as shown in the appended drawings. While the present invention is described in the embodiments below, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention. Orientative words such as "side", "bottom", "front", "back", "left", and "right" as used herein are used for clarity with reference to the orientation of elements in the figures and are not intended to be limiting.

In this description the following terms shall have the following meanings. The term ice blade means any blade which may be used as a runner, glide or other contact point for traversing an ice surface and, without limiting the generality of the foregoing, includes ice skate blades, including speed skate, hockey skate, a leisure skate, and figure skate blades; luge, skeleton, and bobsled running blades; and any other blades which may be used to glide over an ice or snow surface. The ice blades may be made of metal or other materials suitable for shaping and sharpening by removing ice blade material via a grinding action. More particularly, the ice contacting surface is that part of the ice blade which makes contact with an ice surface during use. An ice surface includes a natural ice surface, an artificial ice surface, and a synthetic ice surface (i.e. high density polyethylene, or the like). As such, an ice surface is any type of surface on which an ice blade may be used on and glide over.

Figure 1:
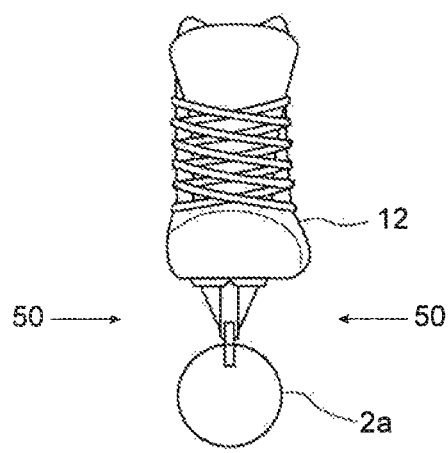
FIG. 1 is front view of an ice skate having an ice blade.
Figure 2A:
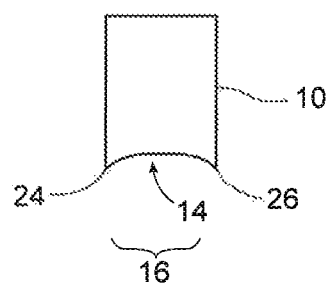
FIG. 2a shows an enlarged view of a cross-section of the ice blade of FIG. 1.
Figure 2B:
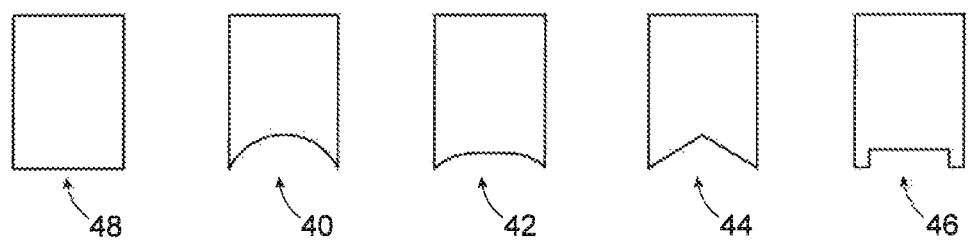
FIG. 2b shows examples of other cross-sections of an ice blade according to embodiments of the present invention.
Figure 3:
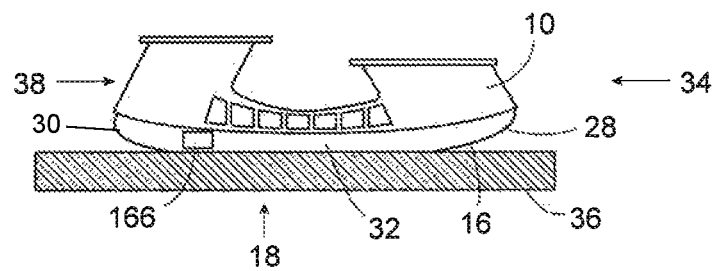
FIG. 3 is a side view of the ice blade of FIG. 1 on an ice surface.

FIGS. 1 and 2 show a typical ice blade 10 on an ice skate 12 which is used a non-limiting example of the type of ice blade 10 to which the present invention may be applied. FIG. 2 shows a cross sectional-view looking straight down the length of the ice blade 10, showing a constant hollow 14 running through the length of the ice contacting surface 16 of the ice blade 10. Although the hollow 14 shown in FIG. 2a has a radiused, or concave-shaped hollow, other shapes may be used, including for example, as shown in FIG. 2b, a V-shaped hollow 44, a square-shaped hollow 46, or other-shaped hollows, including a convex shaped hollow. All such shaped hollows are comprehended by the present invention. The hollow 14 yields sharp edges 24, 26 on each side of the hollow 14. FIG. 3 is a side view of the ice blade 10 and shows three sections of importance for ice blades: the toe section 28, the heel section 30, and the working section 32 which is located between the toe and heel sections 28, 30. Other ice blades may have other shapes in side view, but are still comprehended by the present invention. The toe section 28 in this example has a radius at the front 34 of the ice blade 10 that arcs the ice blade 10 away from an ice surface 36 in use. The heel section 30 has a radius at the back 38 of the ice blade 10 that arcs the back of the ice blade 10 away from the ice surface 36 when in use. The working section 32 has a working radius between the toe section 28 and the heel section 30.

When ice skates 12 are purchased new, the ice blade 10 is fairly standard in shape, within the tolerance limits of the original equipment manufacturer (OEM). Brand new, ice blades usually come unsharpened so that the cross-section as shown in FIG. 2a has no functional hollow 14 or sharpened edges 24, 26 and the longitudinal dimension has a set radius in the working section 26. Although the length of an ice blade 10 may differ according to the size of the ice skate 12, generally, each ice blade 10 has a pre-shaped working section 32 determined by the OEM. For instance, most skates made by Bauer® come with ice blades that have a working section 32 having either a 9-foot radius or a 10-foot radius, and those made by CCM® come with a working section 32 typically having a 10-foot working radius.

Unfortunately, such pre-set working sections may only fit a small portion of users properly. It is well known that the shape of the ice contacting surface 16 of the ice blade 10 can hinder the skater's performance and abilities if the shape is not properly suited to the skater's skating style, abilities, or tendencies.

Also, the choice of hollow 14 may affect the performance of the ice blade 10. With reference to FIG. 2b a deeper hollow 40 may encourage better stopping and turning, whereas a shallower hollow 42 may encourage faster skating speeds. Additionally, the shape of the hollow 14 (i.e. concave-shaped hollow 14, 40, 42, V-shaped hollow 44, square-shaped hollow 46, or other-shaped hollow) may also have different effects on the performance of the ice blade 10. For reference, an ice blade 10 with no functional hollow is also shown in FIG. 2b with numeral 48.

Generally speaking, when viewing the ice blade shape from the side 50 as in FIG. 3, it can be seen that a smaller radius yields less contact area of the working section 32 on the ice surface 36, which allows the skater to be more agile on the ice surface 36 as pivots can be achieved more readily. On the other hand, a larger radius yields more contact area of the working section 32 on the ice surface 36, which allows for greater acceleration, but less lateral mobility. The present invention can be applied to either new ice blades as provided by the OEM, or to already shaped or sharpened ice blades in which the OEM shape has already been altered by a user.

Figure 4:
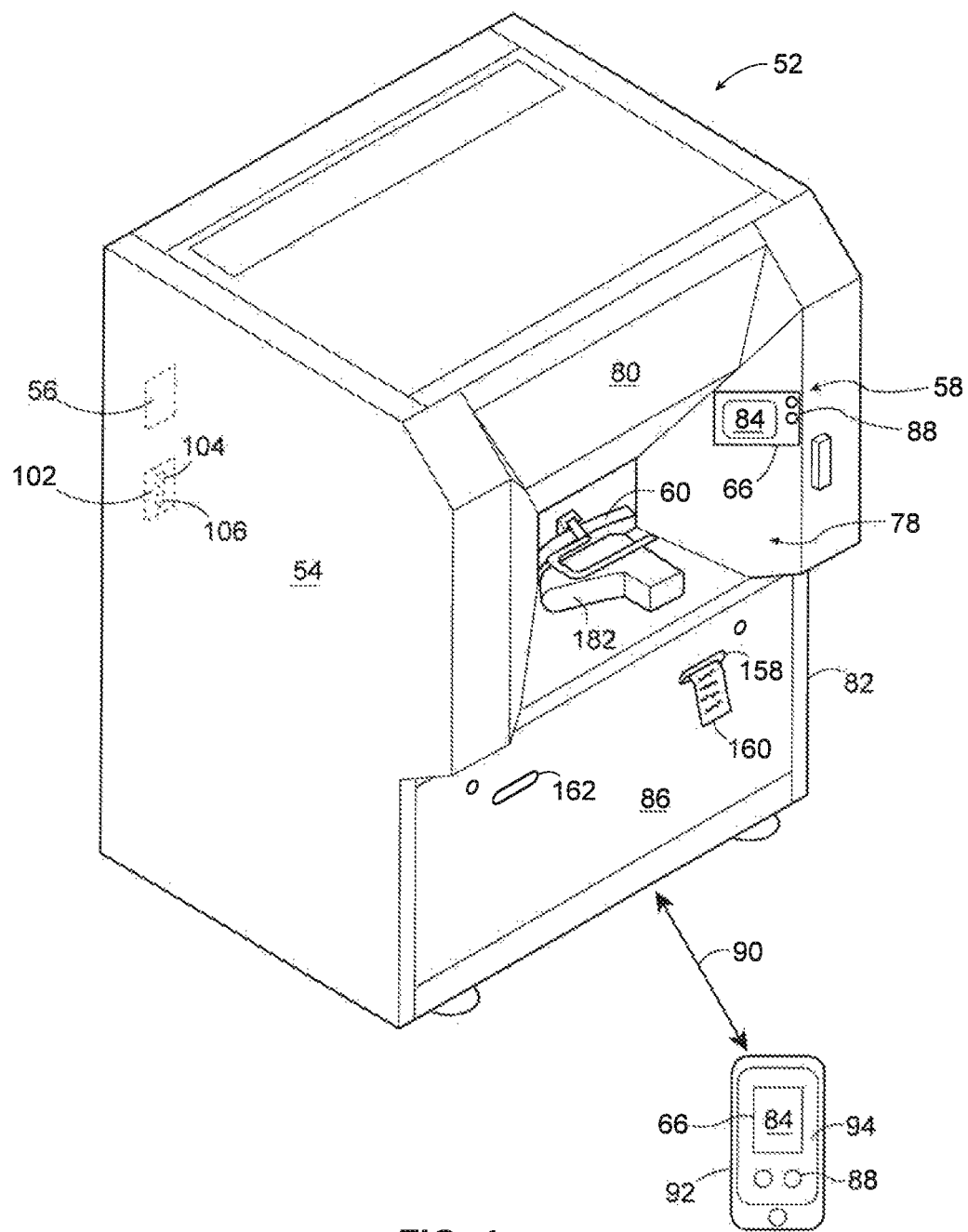
FIG. 4 is a perspective view of an automated apparatus for grinding an ice blade on an ice skate according to an embodiment of the present invention, with the ice skate of FIG. 1 being held in a skate holder of the automated apparatus, and a mobile device being connected to the automated apparatus via a communication link.

With reference now to FIG. 4 there is shown generally an automated apparatus 52 for grinding an ice blade 10 on an ice skate 12, according to an embodiment of the present invention. The apparatus 52 has a housing 54 containing, among other things, a processor 56, an input device 58, a skate holder 60, a measuring device 62, and a grinding device 64, while presenting a clean appearance.

The skate holder 60 is configured to releasably hold at least one ice skate 12 to the automated apparatus 52 in a fixed grinding position. However, the skate holder 60 may be configured to hold more than one ice skate 12, including a pair of ice skates 12, according to other embodiments of the present invention. The input device 58 may also be in communication with the processor 56, and configured to provide either a local, and/or a remote user interface 66 to permit the user to select an ice blade grinding option, which may sharpen the ice blade 10, or change a shape of the ice blade 10 to a desired shape 68. The measuring device 62 may also be in communication with the processor 56, and configured to measure a shape of the ice blade 10. The grinding device 64 may also be in communication with the processor 56, and configured to perform a grinding action on the ice blade 10 held in the skate holder 60, to sharpen the ice blade 10, or change a shape of the ice blade 10 to a desired shape 68, the grinding action being based on the ice blade grinding option selected by the user using the user interface 66.

Figure 5:
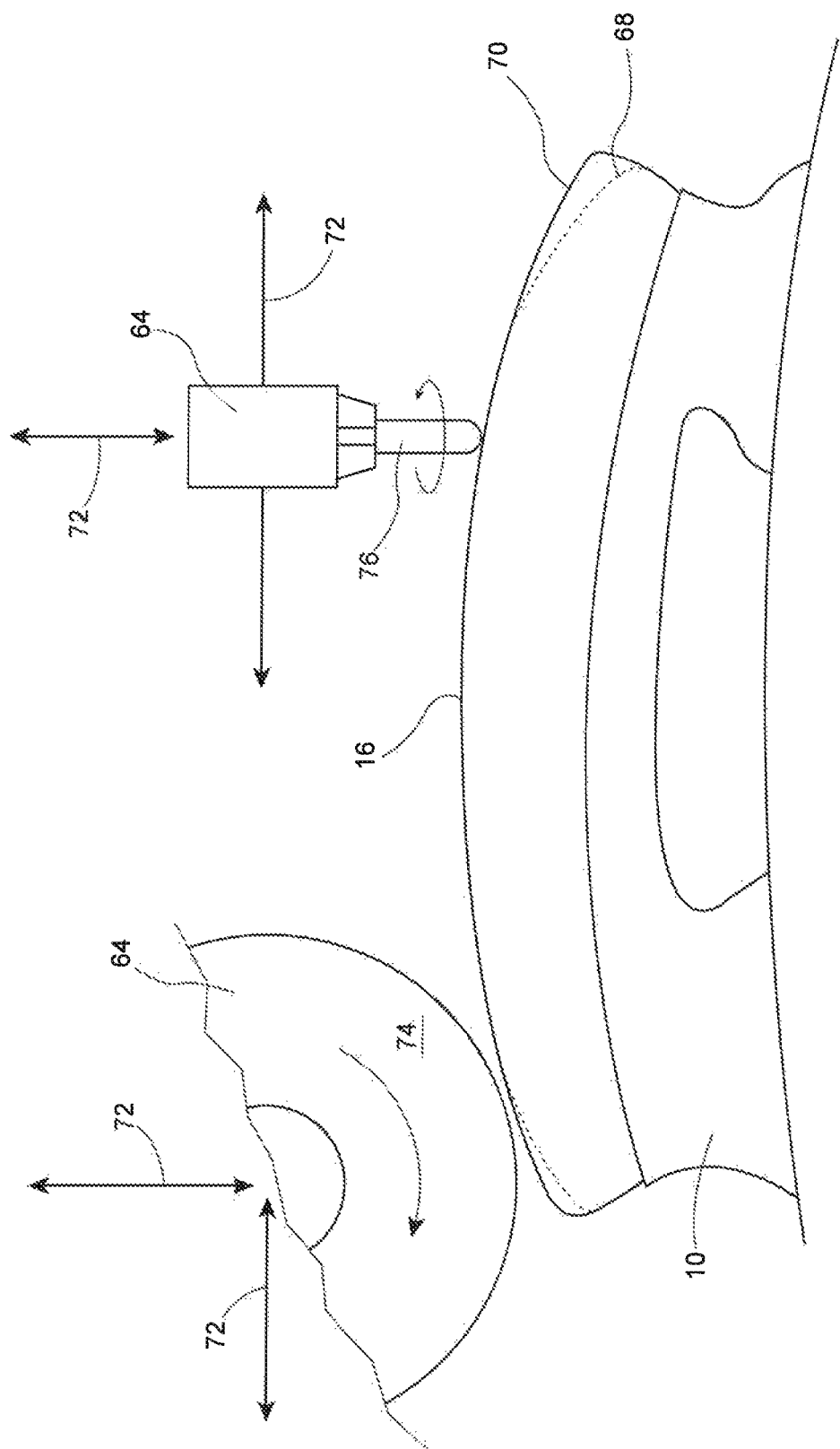
FIG. 5 is a diagram showing two different grinding devices performing a grinding action on the ice blade, according to an embodiment of the present invention.

Two alternate types of grinding devices 64 for performing a grinding action on an ice blade 10, which removes material from the ice blade 10 to change the shape of the ice blade 10 from the measured shape 70 to a desired shape 68, are shown in FIG. 5. The automated apparatus 52 includes one of the two types of grinding devices 64. The grinding devices 64 are shown as capable of moving at least in the direction of the arrows 72. In this example, the grinding action changes the side shape of the ice blade 10 (i.e. the shape of the ice blade 10 when viewed from the left or right side 50 of the ice blade 10). The left-most grinding device 64 is illustrated with a grinding wheel 74, while the right-most grinding device is illustrated with a milling bit 76. The left-most and right-most grinding devices 64 are illustrated as having spin axes that are perpendicular to one another. The measuring device 62 and the grinding device 64 are discussed in more detail below.

The automated apparatus 52, as shown in FIG. 4, is sized and shaped in the form of a self-serve kiosk. The front 86 of the automated apparatus 52 may include an opening 78 to permit the user to place the ice skate 12 into the skate holder 60. The opening 78 is covered by a shield 80 adapted to block flying dust and debris formed during operation of the grinding device 64 from hitting the user, or to prevent the user from reaching into the automated apparatus 52 through the opening 78 with his or her fingers, hands, or arms during certain sequences in the operation of the automated apparatus 52, thereby helping to prevent injury to the user. In an embodiment, the shield 80 is transparent to allow the user to look through the shield 80 into the opening 78 and see the action of the measuring device 62 and the grinding device 64 during certain sequences in the operation of the automated apparatus 52. The shield 80 may be removably, or hingedly, attached to the housing 54 to allow the shield 80 to be moved out of the way to permit the user to access the inside of the housing 54 through the opening 78, for example, to facilitate placing the ice skate 12 into the skate holder 60, to permit cleaning the inside of the housing 54, or to permit repair or adjustment of the measuring device 62, the grinding device 64, or other components of the automated apparatus 52 located inside of the housing 54. To increase safety, the automated apparatus 52 has sensors in communication with the processor 56 and configured to ensure that certain sequences of operation of the automated apparatus 52, such as for example the grinding device 64 performing a grinding action, will not start, or if started, will stop, when the sensors detect that the shield 80 is not in a closed position.

The automated apparatus 52 includes a raised base portion 82 to raise the opening 78 above the floor to a height that is comfortable for use while the user is standing. In other embodiments, the automated apparatus 52 may be provided without the raised base portion 82, for example, and the automated apparatus 52 is designed to sit on a table, or a counter top.

As shown in FIG. 4, the input device 58 may be incorporated into the housing 54 to provide a local user interface 66. The user interface 66 may have a display 84 and/or an input device 58 engageable by the user, such as buttons 88. However, the present invention comprehends other input devices 58, including other user interfaces, as well as user interfaces having other configurations of displays 84 and/or input devices; other forms of input devices comprehended by the present invention include a touch screen, a touch pad, a keyboard, a keypad, a trackball, a joystick, and the like. Furthermore, the user interface 66 may be provided only locally in association with the automated apparatus 52, only remotely, or both locally and remotely as shown in FIG. 4.

To provide a remote user interface 66, the input device 58 may be configured with a communication link 90 to a user's mobile device 92, permitting data to be sent by the input device 58 and received by the mobile device 92, and vice versa. The mobile device 92 may include a software application 94 configured to send and receive data to and from the input device 58 via the communication link 90, and provide a user interface 66 on the mobile device 92. In this way, the user may use the software application 94 on the mobile device 92 to operate the automated apparatus 52, thereby eliminating the need for incorporating a user interface 66 into the automated apparatus 52 itself. In other words, the user may use the mobile device 92 to operate the automated apparatus 52 remote from but in close proximity to the automated apparatus 52, or from a remote location that may be a great distance from the automated apparatus 52. Of course, the present invention also comprehends embodiments in which the user interface 66 is provided both on the automated apparatus 52, as well as on a mobile device 92.

Figure 6:
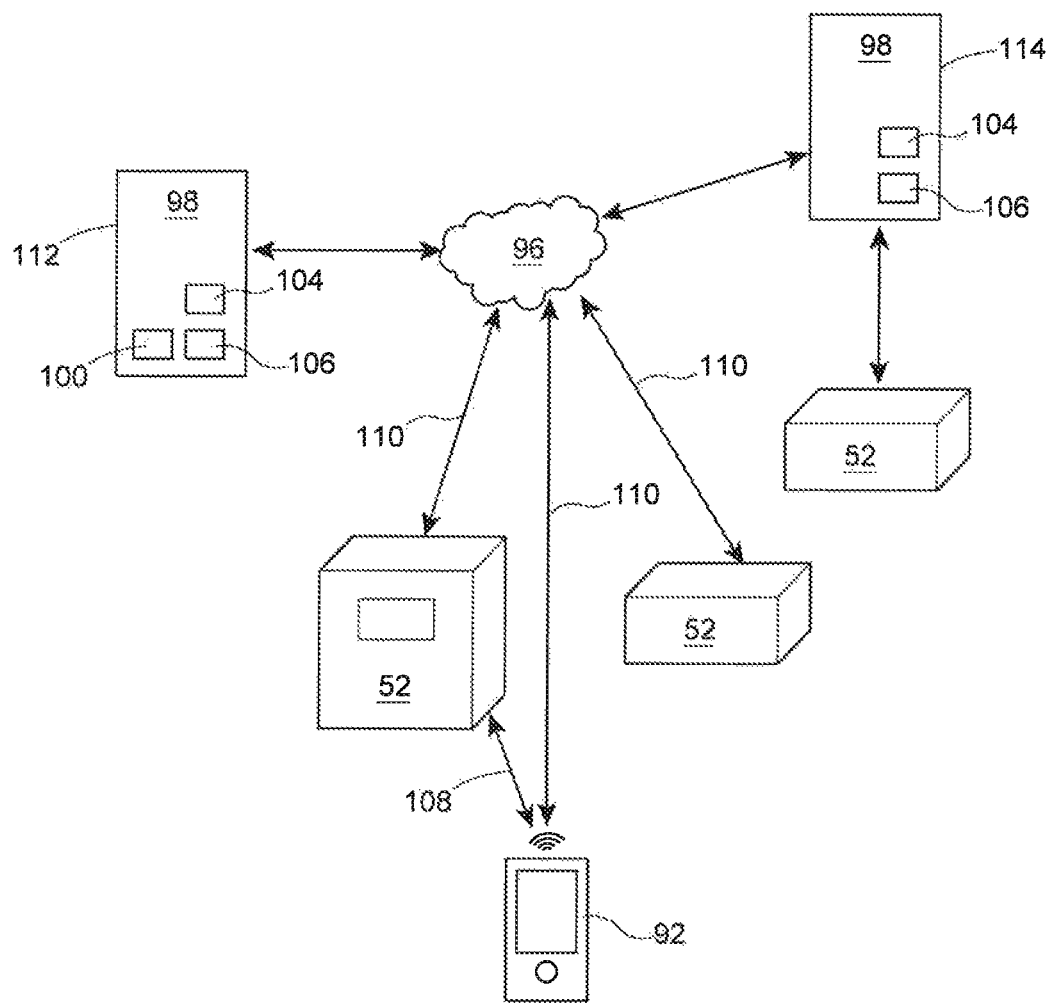
FIG. 6 is a network map showing a plurality of automated apparatuses and the mobile device of FIG. 4 being operatively connected to the cloud and cloud accessible servers.

The communication link 90 may be enabled by any of a number of known ways, including a Bluetooth connection, a Wi-Fi connection, an NFC connection, an internet connection, and an SMS connection between the input device 58 and the user's mobile device 92, or the like. Furthermore, the communication link 90 may be indirect and involve servers in the cloud 96, as shown in FIG. 6, or accessible through the cloud 98, as will be appreciated by persons skilled in the art. Such cloud based, or cloud accessible servers may contain the user accounts 100.

Furthermore, the software application 94 may be web-based, such that the user can access the user interface 66 via a web browser on the mobile device 92, or a web-browser on any other internet enabled device, including a desktop computer, a laptop computer, a PDA, a tablet, a netbook, a notebook, etc. Thus, while in an embodiment of the invention, the user may communicate with the automated apparatus 52 using the software application 94 on the mobile device 92, in other embodiments of the invention, the user may accomplish the same by accessing the software application 94 on a website on a desktop computer, a laptop computer, a PDA, a tablet, a netbook, a notebook, etc. To gain access to the website, the user may log in to the website in a known manner, entering a login and password, sending an e-mail, through social media (i.e. using a Facebook account, a Twitter account, a Google account, etc.) or through a mobile app.

The user interface 66 allows the user to interact with and communicate with the automated apparatus 52. The user interface 66 obtains information from the user and provides information to the user. The user interface 66 may prompt the user to select, or enter an option which the automated apparatus 52 is capable of carrying out, such as an ice blade grinding option. The ice blade grinding option may include changing a shape of the whole of the ice contacting surface 16 of the ice blade 10, or only a portion thereof. Furthermore, the ice blade grinding option may include varying the change to the shape of the ice contacting surface 16 along the length of the ice blade 10. Additionally, the ice blade grinding option may include changing the shape of the ice contacting surface 16 by changing the side shape at one or more of a toe section 28, a working section 32, and a heel section 30 of the ice contacting surface 16.

The ice blade grinding option may further include changing the shape of the ice contacting surface 16 of the ice blade 10 in cross-section, for example, by one or more of forming a hollow 14, changing the shape of an existing hollow 14, removing an existing hollow 14, and smoothening an existing hollow 14. As mentioned above, the hollow 14 may be a concave-shaped hollow 14, 40, 42, a V-shaped hollow 44, a square-shaped hollow 46, or other-shaped hollow, including a convex shaped hollow. In an embodiment, a different hollow 14 may be placed at different points of the ice blade 10. In other words, the grinding action may create a new hollow 14 or change the shape of an existing hollow 14, which varies along the length of the ice blade 10. By way of example, an ice blade 10 with no hollow is shown in FIG. 2b at 48. As yet another example, the ice blade grinding option may include raising either the left blade edge 24 relative to the right blade edge 26, or vice versa. Similarly, the ice blade grinding option may include making the left and right blade edges 24, 26 the same height. Furthermore, the ice blade grinding option may simply include sharpening the ice blade 10.

The ice blade grinding option may include changing the shape of the ice contacting surface 16 to a desired shape 68 that is based on a model ice blade. For example, the model ice blade may be based on an ice blade 10 used by a professional hockey player, a professional figure skater, or the like. As another example, the model ice blade may be based on an actual ice blade having a particular skating characteristic, or a theoretical ice blade having a particular estimated skating characteristic. The automated apparatus 52 may include a memory 102, embodied as a non-transitory computer-readable medium such as ROM memory, in communication with the processor 56, and the memory 102 may be used to store one or more model ice blade datasets 104 corresponding to the shape of a model ice blade, or a portion thereof. Accordingly, an ice blade grinding option may include changing the shape of the ice contacting surface 16 of an ice blade 10 to a desired shape 68 that is at least partly based on a model ice blade dataset 104 corresponding to the model ice blade, or portion thereof, which is stored in the memory 102. It is also contemplated that the model ice blade datasets 104 may be located remote from the automated apparatus 52 and accessible to the processor 56. For example, the model ice blade dataset 14 may be stored in the cloud 96 or a cloud accessible server 98.

The memory 102 may also be used to store a user profile 106. For example, the user profile 106 may include historical data, such as, shapes of ice blades previously used with the automated apparatus 52 (both before and after performing the grinding action), and ice blade grinding options previously selected by the user, including desired ice blade shapes applied to the user's ice blade(s). Additionally, the user profile 106 may include other data such as one or more biometric or other parameters of the skater associated with an ice blade 10. By way of example, the user profile 106 may include the skater's height, weight, maximum bent knee angle while performing a skating motion, and spinal forward tilt while performing a skating motion. The other parameters may include, for example, a skater's skill level, age, experience, playing position in an ice-related activity such as the game of hockey, subjective preferences, skate make and model, etc. Other such parameters of the skater will be appreciated by the person skilled in the art, and are comprehended by the present invention.

The processor 56 accesses the memory 102 and analyzes the user profile 106 to determine one or both of an ice blade wear pattern and a skating style of a skater associated with the ice skate 12. Furthermore, the processor 56 may be configured to select or recommend a desired ice blade shape 68, at least partly based on the analysis. For example, if the user profile 106 includes the selected ice blade grinding option for one of a matched pair of ice skates 12, the processor 56 may select or recommend a desired shape 68 for the other of the matched pair of ice skates 12, based at least partly on the data of the first ice skate 12 stored in the historical data, to ensure that the ice contacting surfaces 16 of the pair of ice skates 12 will match. As another example, the processor 56 may be configured to alert the user of a "problem" in the gait of a skater associated with an ice skate 12, based on an analysis of a plurality of stored user profiles 106 containing information associated with a plurality of skaters. It is contemplated that such analysis from a plurality of ice skate 12 shaping and sharpening sessions may reveal trends that may be used to identify such potential gait problems. The memory 102 may be incorporated into the automated apparatus 52, and located inside the housing 54. It is also contemplated that the user profile 106 may be located remote from the automated apparatus 52 and accessible to the processor 56. For example, the user profile 106 may be stored in the cloud 96, or a cloud accessible server 98 as shown in FIG. 6. Other ice blade grinding options will be appreciated by persons skilled in the art, including simple sharpening or smoothening of the ice contacting surface 16 of the ice blade 10.

As shown in FIG. 6, a plurality of automated apparatuses 52 may be operatively connected to the cloud 96, and cloud accessible servers 98, according to an embodiment of the present invention. A mobile device 92 is shown with possible connections to automated apparatuses 52 which are direct 108, such as for example Bluetooth, Wi-Fi, and NFC, or indirect 110 via the cloud 96. As will be appreciated, the indirect connections via the cloud may be established via an internet connection using Wi-Fi, a cellular network, or the like. A cloud accessible main server 112 may be set up to allow an operator to control and maintain the network of automated apparatuses 52. Accordingly, the main server 112 may be configured to store, maintain and update user accounts 100, and user profiles 106, including historical data, and biometric parameters of the skater associated with an ice blade 10. The main server 112 may also be configured to store model ice blade datasets 104, and control their distribution to automated apparatuses 52 in the network. For example, the main server 112 may allow the automated apparatus 52 to download, or use a model ice blade dataset 104 only if requested by a user or operator of the automated apparatus 52, and/or a fee is paid for the use or download of the model ice blade dataset 104. The model ice blade datasets 104 may be made available for purchase, or lease (i.e. made available for a limited time period). The main server 112 may also be configured to process payments made by the user and update user accounts 100. It is also contemplated that a cloud accessible club server 114 may be set up to allow, for example, a hockey club or arena to control access to an automated apparatus 52 operated by the hockey club or arena. The club server 114 may be configured to store, maintain and updated user profiles 106.

Figure 7:
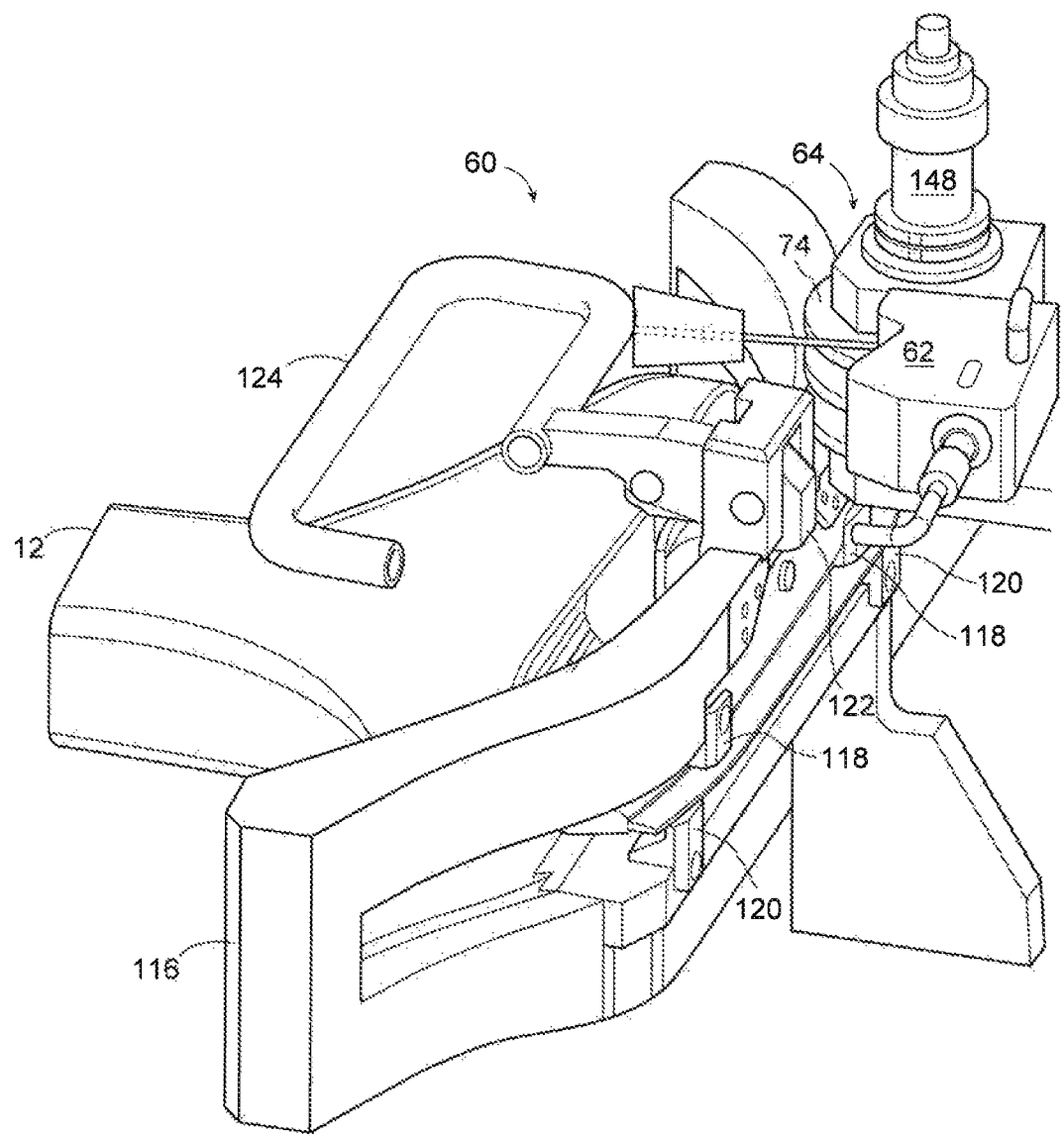
FIG. 7 is a perspective view of the ice skate held in the skate holder of FIG. 4

The skate holder 60 is shown in FIG. 7. The measuring device 62 and the grinding device 64 are operationally positioned relative to the skate holder 60. The skate holder 60 has a body 116 having a first skate contacting surface 118 and a second skate contacting surface 120. In this embodiment, the first skate contacting surface 118 is movable toward the second skate contacting surface 120 to permit the hockey skate 12 to be clamped between the first and second skate contacting surfaces 118, 120. The second skate contacting surface 120 is fixed in position in this example. However, the opposite, in which the first skate contacting surface 118 is fixed in position, and the second skate contacting surface 120 is movable towards the first skate contacting surface 118, is also comprehended by the present invention. Furthermore, both the first and second skate contacting surfaces 118, 120 may be configured to be movable towards each other at the same rate so that the ice blade 10 of the hockey skate 12 will be automatically centered in the body 116 of the skate holder 60. Movement of the first skate contacting surface 118 and/or the second skate contacting surface 120 may be accomplished by a cam 122 and handle 124 arrangement which is manually operable by the user, as will be appreciated by the person skilled in the art. However, the movement of the first skate contacting surface 118 and/or the second skate contacting surface 120 may be accomplished by other mechanisms, such as for example, an actuator, which may also be controlled by the processor 56. What such skate holders 60 may have in common is the ability to accurately hold the ice blade 10 in position, against the grinding action performed by the grinding device 64.

The measuring device 62 is operationally positioned relative to the skate holder 60 to measure a shape of the ice contacting surface 16 of the ice blade 10. The measuring device 62 is positioned and configured to measure a shape of the ice contacting surface 16 of the ice blade 10 to create a dataset which corresponds to the shape of the ice contacting surface 16 of the ice blade 10. In various embodiments, the measuring device 62 may take several single point, two dimensional (2D) measurements, or 3D measurements. The measurements taken by the measuring device 62 are merged together, either by the measuring device 62 or the processor 56, to construct a 3D measured dataset corresponding to the 3D shape of the ice contacting surface 16 of the ice blade 10. The 3D measured dataset may then be stored in memory 102. Thus, the measuring device 62 provides a precise measurements of the physical dimensions of the ice contacting surface 16 of the ice blade 10, which is recorded into a measured dataset.

Figure 8:
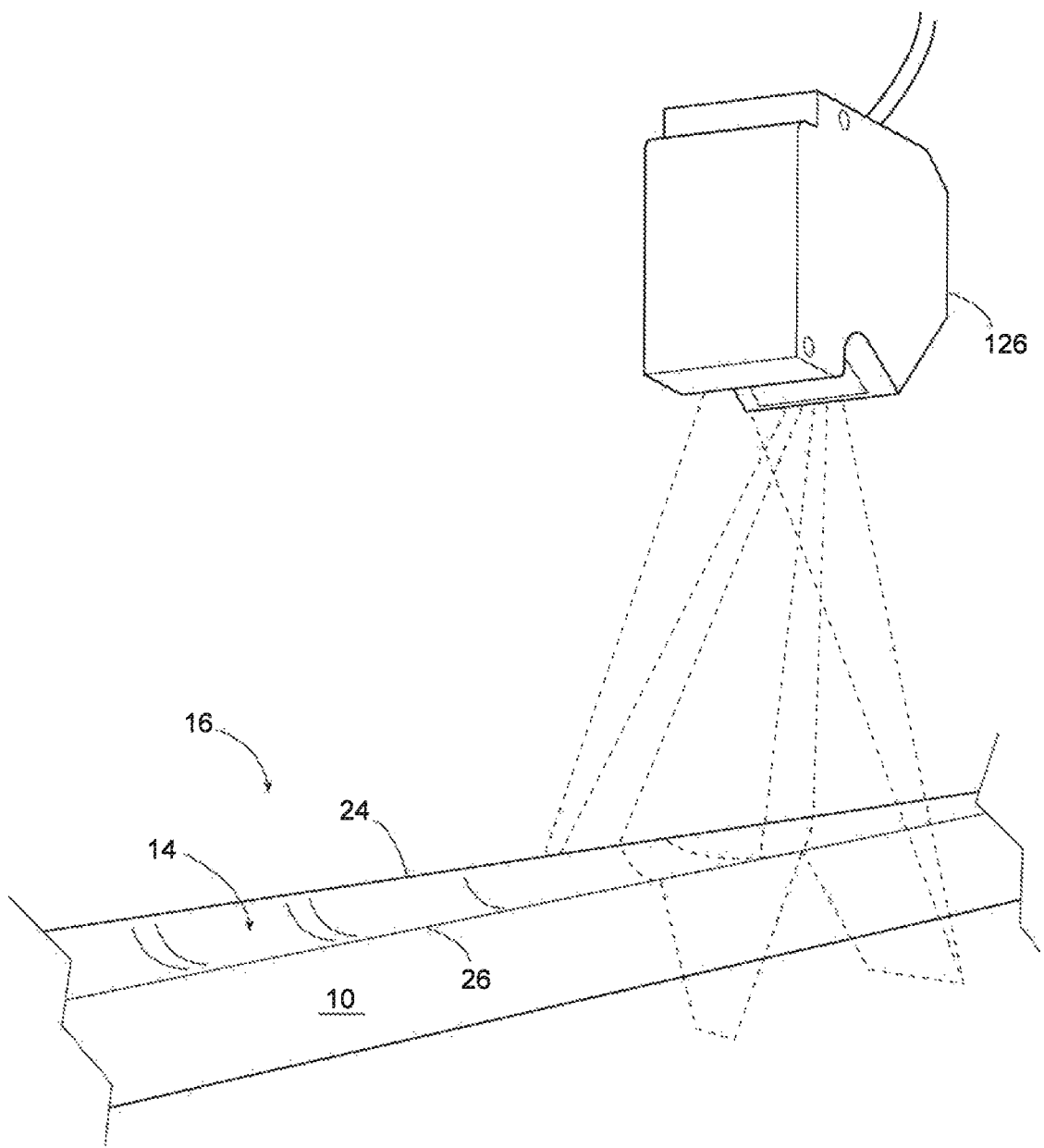
FIG. 8 is a view of an ice contacting surface of an ice blade being measured by a measuring device according to an embodiment of the present invention.

The measuring device 62 may be a non-contact or contact type device. Examples of non-contact type measuring devices 62 include, laser scanners, camera vision devices, and optical scanners. Examples of contact type measuring devices 62 include depth gauges, and micrometers. While measuring and/or inspecting the shape of the ice contacting surface 16 of an ice blade 10 is an automated noninvasive process, such as a high precision laser scanning system or other optical means, the method may include other mechanical devices such as depth gauges, micrometers, and the like, to either perform or complement the measurements taken with the laser scanning system. One example of a noninvasive laser scanner is currently manufactured by MICRO-EPSILON Messtechnik GmbH & Co. KG (Raleigh, N.C., U.S.A.). Alternatively, optical based scanners with 3D functionality can also be used to perform these measurements, one example of such an optical scanner is the METRAS-CAN 3D™ manufactured by Creaform Inc. (Levis, Quebec, Canada). The measurements may be sufficiently accurate and sufficiently detailed to create an accurate 3D numerical representation of the ice contacting surface 16 of the ice blade 10. In one embodiment, the invention may include a laser measurement device 126, as shown in FIG. 8, with a scanner beam 128 which is able to read the ice contacting surface 16 of the ice blade 10 to at least ⅛-inch accuracy and, in some embodiments, to within about 1 to 10 microns accuracy. The laser measurement device 126 has a resolution of 10 microns or less and uses triangulation to measure the shape of the ice contacting surface 16 of the ice blade 10. The laser measurement device 126 has a sample rate of at least 100 Hz and may also be a low power laser scanner having a power of less than 10 watts. Such a measuring device 126 or 3D scanner takes measurements across the hollow 14 and all along the length of the ice contacting surface 16 of the ice blade 10. As will be understood, for the present invention to provide adequate results, the accuracy of the measurement for the dataset may be greater than, or equal to, the accuracy of the dimensional changes which may be made to the shape of the ice contacting surface 16 through the grinding action performed by the particular grinding device 64 included in the automated apparatus 52.

Figure 10:
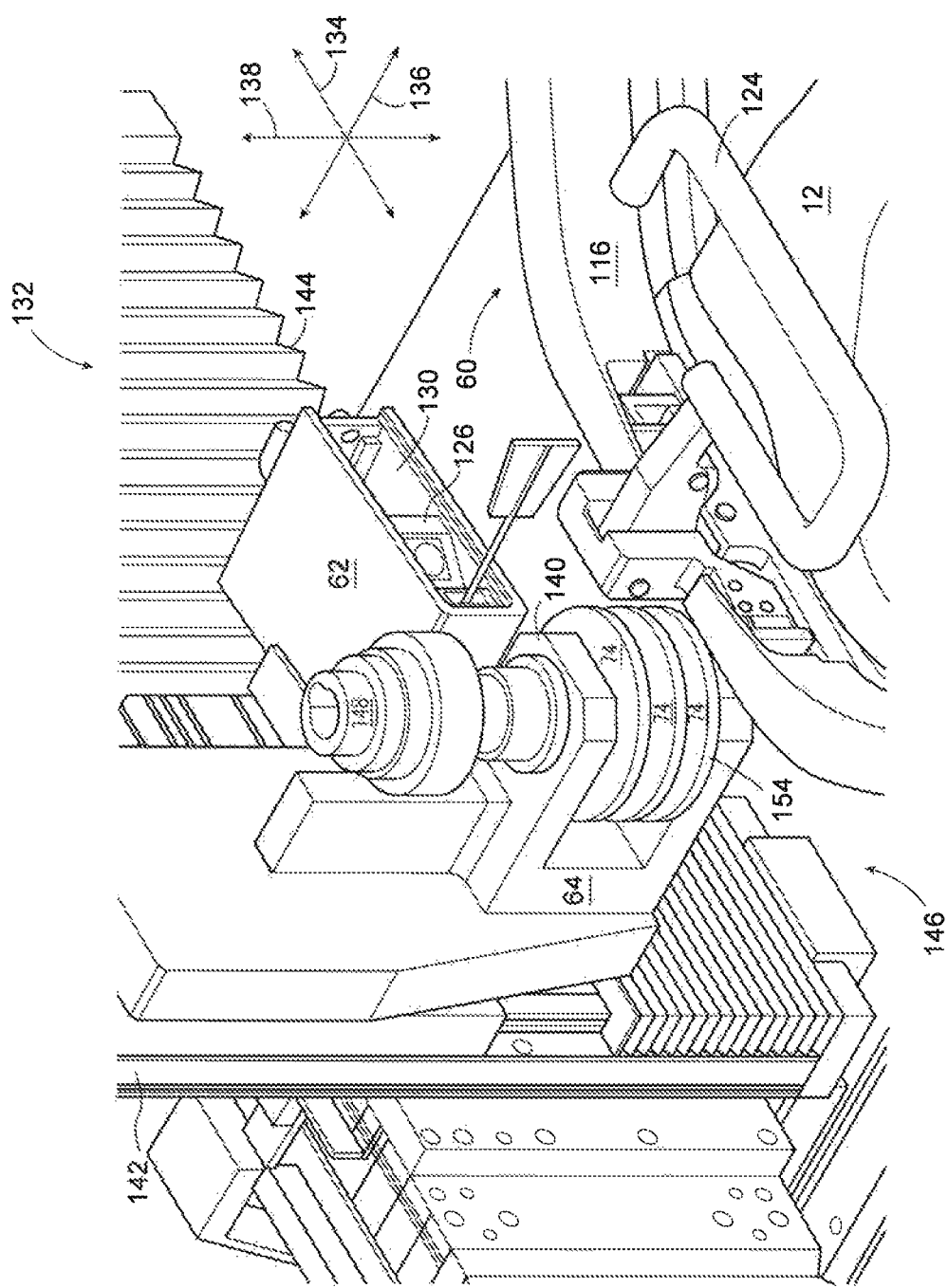
FIG. 10 is a perspective view of a detail of FIG. 9 centered on the grinding device.

The measuring device 126 may be a profile sensor which creates a point cloud measurement dataset, which is reconstructed into a 3D model of the ice blade 10 by the processor 56. The measuring device 126 makes more than one scan of the ice contacting surface 16 of the ice blade 10 to create multiple point cloud sets which in turn are aligned in a common reference system by the processor 56 to generate the measured dataset. As shown in FIG. 10, the measuring device 126 is housed in a transparent protective housing 130. The measuring device 126 will scan multiple times to create a number of datasets of the same ice blade 10 which datasets can then be merged for greater accuracy. Such a measuring device 126 will be able to measure off center issues like bent blades, damage in the form of nicks and the like, and excessive wear. The present invention comprehends measuring the ice contacting surface 16 of the ice blade 10 to measure the 3D shape of the ice contacting surface 16 of the ice blade 10 held in the holder 60.

Figure 9:
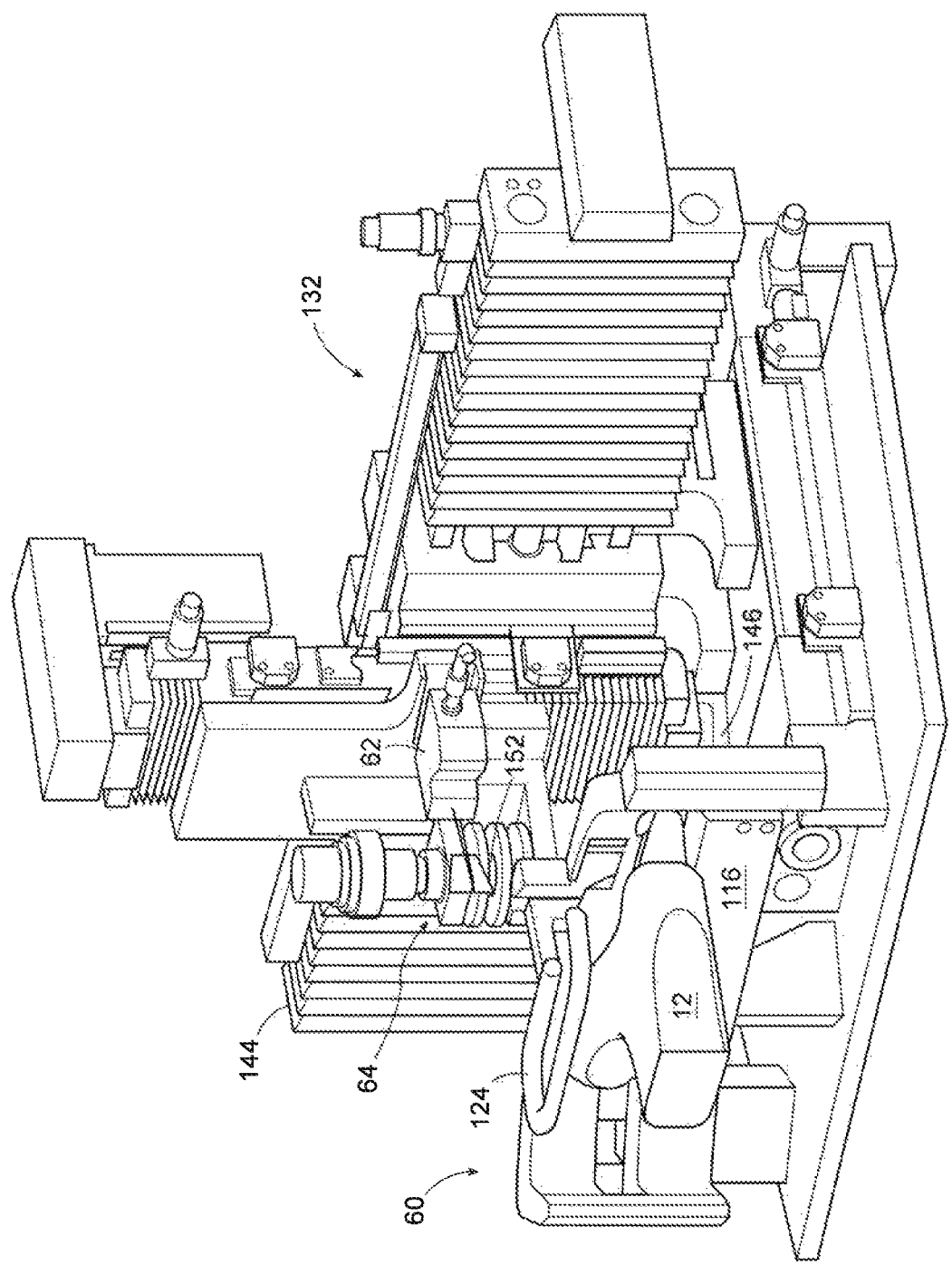
FIG. 9 is a perspective view of the inside of the automated apparatus of FIG. 4, showing the ice skate being held in the skate holder in a fixed position relative to a measuring device and a grinding device.

In the embodiment shown in FIGS. 9 and 10, the measuring device 62 is positioned adjacent to the grinding device 64 and shares a common carriage assembly 132, which may be controlled by the processor 56, to move the measuring device 62 and the grinding device 64 in at least two dimensions relative to the ice blade 10 held in the skate holder 60. One of the two dimensions may be defined by a first axis 134 generally parallel to a longitudinal axis of the ice blade 10, and the other dimension may be defined by a second axis 136 generally perpendicular to the first axis 134 and oriented in a plane parallel to the side surface 50 of the ice blade 10.

The grinding device 64 is adapted to move in three dimensions, such that the third dimension is along third axis 138, which is perpendicular to both of the above mentioned first axis 134 and second axis 136. Accordingly, the grinding device 64 may comprise a grinding head 140 attached to a carriage assembly 132 that is configured to move the grinding head 140 along at least two dimensions relative to the ice blade 10 held in the skate holder 60, and, in some embodiments, along all three dimensions. By way of example, the carriage assembly 132 may comprise linear controlled slide mechanisms, or rails 142, 144, 146 oriented to permit the grinding head 140 to move along each of the three dimensions. Suitable results have been obtained with ball rail tables available from Bosch-Rexroth Corporation (Charlotte, N.C., U.S.A.). The carriage assembly 132 may move the measuring device 62 and the grinding device 64 in a computer numerical controlled manner along three axes 134, 136, 138 relative to the ice blade, to an accuracy of at least 1/16-inch, and in an embodiment, to an accuracy between 10 and 20 microns. The carriage assembly 132 will be understood by persons skilled in the art and so its details will not be described further herein.

While providing the measuring device 62 and the grinding device 64 on a common carriage assembly 132 is convenient, and efficient and cost effective, it will be appreciated by persons skilled in the art that the measuring and grinding devices 62, 64 may be provided on separate carriage assemblies such that they can be moved independently relative to the ice blade 10 held in the skate holder 60. Additionally, although the measuring and grinding devices 62, 64 are moved by the carriage assembly 132 relative to the ice blade 10 held in a fixed grinding position in the skate holder 60, it will be appreciated by persons skilled in the art that the opposite arrangement may be used, according to other embodiments of the present invention. For example, the skate holder 60 may be configured to be moved by a carriage assembly in at least one, and in some embodiments three dimensions, relative to measuring and grinding devices 62, 64 which may be fixed in position in the housing 54. Furthermore, it will be appreciated by persons skilled in the art that the measuring and grinding devices 62, 64 and the skate holder 60 may each be movable relative to one another, by separate carriage assemblies under independent control of the processor 56, to accomplish their respective measuring, scanning and grinding functions.

The grinding head 140 includes one or more rotary grinding tools driven by an electric motor 148. By way of example, the grinding tool may be a grinding wheel, grinding stone, abrasive point, cutting bit, router bit, milling bit, sanding band, or the like. Thus the grinding tool may be adapted to grind, cut, drill, or mill the material of the ice blade 10. However, the term grinding comprehends any means for removing material from the ice blade 10 to shape the ice blade 10, including grinding, cutting, drilling, milling, laser ablation, water ablation, and the like. In the embodiment shown in FIGS. 9 and 10, the grinding tool comprises three grinding wheels 74 attached to the same shaft 152 and driven by the same motor 148. Each of the grinding wheels 74 has a different grinding characteristic. Examples of different grinding characteristics may include one or both of a difference in coarseness and a difference in the shape of the grinding surface 154 of the grinding wheel 74. The shape of the grinding surface 154 may be selected from a flat shape, a ⅜ inch radius convex shape, a ½ inch radius convex shape, a 9/16 inch radius convex shape, a ⅝ inch radius convex shape, a ¾ inch radius convex shape, a 1 inch radius convex shape, a V-shape, a square shape, as well as any other shape that may be deemed suitable by the person skilled in the art. The ⅜ inch radius convex shape, ½ inch radius convex shape, 9/16 inch radius convex shape, ⅝ inch radius convex shape, ¾ inch radius shape, and 1 inch radius convex shape grinding surface shapes are suitable for applying ⅜ inch, ½ inch, 9/16 inch, ⅝ inch, ¾ inch, and 1 inch concave hollows 14, which are commonly applied to ice blades. However, as will be appreciated by persons skilled in the art, the shape of the grinding surface 154 may be any shape and size required to shape the ice contacting surface 16 to the desired shape. Accordingly, the present invention comprehends all such shapes of grinding surfaces 154, including convex, concave, and other custom shapes. The grinding head 140 further includes a deburring tool attached to the shaft 152. For example, a deburring wheel in substitution with one of the three grinding wheels 74, or in addition to the three grinding wheels 74 in the above example.

The grinding device 64 is configured to move relative to the ice blade 10 held in the holder 60 to bring the rotary grinding tool into contact with the ice contacting surface 16 of the ice blade 10 along the length of the ice blade 10 and perform a grinding action on the ice blade 10 based on the ice blade grinding option selected by the user, to change the shape of the ice blade 10 to a desired shape 68. In other embodiments, the holder 60 may also be movable relative to a stationary, or independently movable grinding device, to bring the rotary grinding tool into contact with the ice contacting surface 16 of the ice blade 10 along the length of the ice blade and perform a grinding action on the ice blade 10. The grinding action may remove material from the ice blade 10 to change the shape of the ice contacting surface 16 in cross-section. The change to the ice contacting surface 16 in cross-section may include forming a hollow 14 in the ice contacting surface 16, changing the shape of an existing hollow 14 in the ice contacting surface 16, removing an existing hollow 14 from the ice contacting surface 16, smoothening an existing hollow 14 in the ice contacting surface 16, or combinations thereof. As mentioned above, the hollow 14 may be a concave-shaped hollow 14, 40, 42, a V-shaped hollow 44, a square-shaped hollow 46, or other-shaped hollow, including a convex-shaped hollow. By way of example, an ice blade 10 with no hollow is shown in FIG. 2b at 48. Furthermore, the change to the shape of the ice contacting surface 16 may vary along the length of the ice blade 10.

The grinding action removes material from the ice blade 10 to change the side shape of the ice contacting surface 16 (i.e. the shape of the ice contacting surface as viewed from the left or right side 50 of the ice blade 10). The change to the side shape of the ice blade 10 may include a change at a toe section 28 of the ice blade 10, a heel section 30 of the ice blade 10, a working section 32 of the ice blade 10, or combinations thereof. As yet another example, the grinding action may remove material from the ice blade 10 to raise either the left blade edge 24 relative to the right blade edge 26, or vice versa. Similarly, the grinding action may remove material from the ice blade 10 to make the left and right blade edges 24, 26 the same height. Furthermore, the grinding action may simply sharpen the ice blade 10.

After the grinding device 64 performs the grinding action on the ice blade 10, the processor may be configured to cause the measuring device 62 to re-measure the shape of the ice blade 10. Then the processor 56 may calculate a difference between the re-measured shape and the desired shape 68, and if the difference is greater than a predetermined acceptable value, the automated apparatus 52 may alert the user, and or repeat the grinding action.

The processor 56 determines if the ice blade 10 is unsuitable for the selected ice blade grinding option prior to the grinding device performing the grinding action. If the processor 56 determines that the ice blade 10 is unsuitable for the selected ice blade grinding option, the apparatus 52 may provide an alert to the user, for example with an indication on the user interface 66. Furthermore, the processor 56 may be configured to render ice blade grinding options unavailable for selection by a user if the ice blade 10 is unsuitable. Alternately, the processor 56 may be configured to simply not act on a selected ice blade grinding option if the ice blade 10 is unsuitable. By way of example, the ice blade 10 may be unsuitable for the selected ice blade grinding option if the ice blade 10 is too warped, too worn, lacks sufficient material for the grinding action to change the shape of the ice blade 10 to the desired shape 68, or the grinding action would result in the ice blade 10 being out of manufacturer defined tolerance limits.

Figure 11:
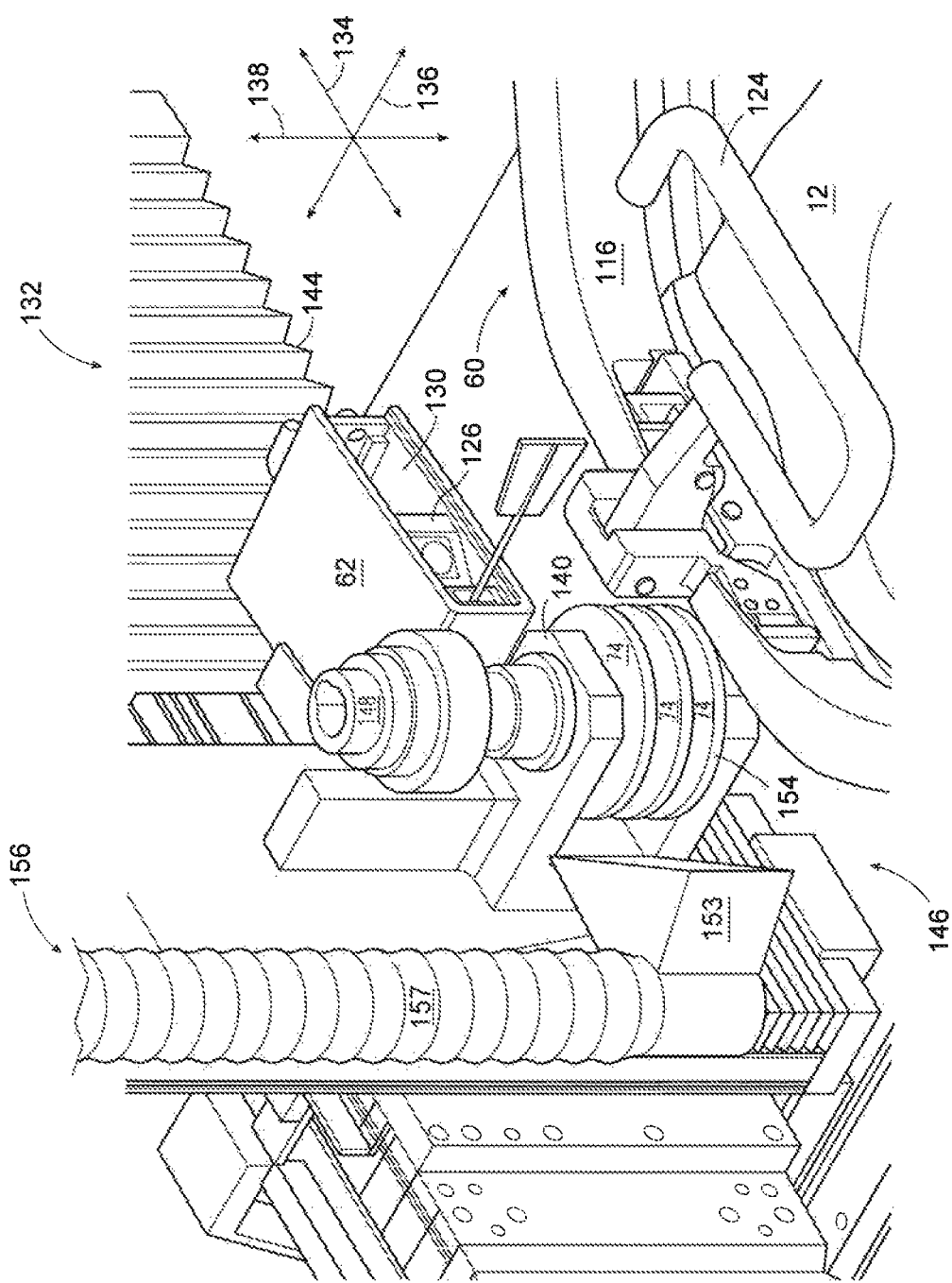
FIG. 11 shows a vacuum device according to an embodiment of the present invention.

As can be expected, the grinding action performed on an ice blade 10 by the grinding device 64 will remove material from the ice blade 10 creating dust and debris. To assist with containing the dust and debris, the automated apparatus 52 may be provided with a vacuum device 156, as shown by way of example in FIG. 11, configured to capture and contain the dust and debris. The vacuum device 156 may also be in communication with, and controlled by the processor 56. Alternately, the vacuum device 156 may be set to turn on at a predetermined time, such as when the grinding device 64 is active, and turn off at a predetermined time, for example, when the grinding device 64 is not activated. By way of example, the vacuum device 156 has a vacuum head 153 positioned relative to the grinding device 64 to suck up the dust and debris as it is formed by the grinding action. The vacuum head 153 may be operatively connected to a suction device (not shown) contained in housing 54 via a hose 157.

Figure 12:
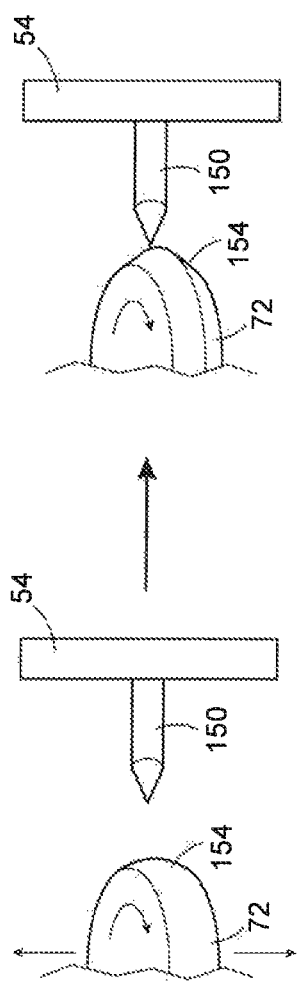
FIG. 12 shows a grinding surface of a grinding wheel of the grinding device engaging a single point diamond dressing pen positioned within the housing to dress the grinding surface and change the shape of the grinding surface, according to an embodiment of the present inventions.

The automated apparatus 52 further has a dressing tool 150, shown in FIG. 12, dressing or shaping the grinding surface 154 of the rotary grinding tool (i.e. grinding wheel 74). According to one embodiment of the present invention, the grinding wheel 74 is constantly dressed with a diamond cutter in the grinding head 140 of the grinding device 64, which constantly adjusts the grinding surface 154 to ensure that when performing a grinding action, the hollow radius will be the correct dimension. Additionally, the grinding wheels 74 may be provided in the grinding device 64 with the grinding surface 154 already dressed to the desired shape. However, since the grinding head 140 of the present invention is movable within the housing 54 along at least two dimensions, it is contemplated that the dressing tool 150 may include a diamond cutter, or other any other known dressing tool 150 positioned within the housing 54 at a position where the grinding head 140 can move to and engage the dressing tool 150 and cause the grinding surface to be dressed. As shown in FIG. 12, the dressing tool 150 may be a single point diamond dressing pen positioned within the housing 54, and the processor 56 is configured to move the grinding head 140 to engage the dressing pen and draw the grinding surface 154 across the dressing pen in a computer numerically controlled manner to dress the grinding surface 154 or even to change the shape of the grinding surface 154. Accordingly, it will now be understood that the present invention comprehends an automated apparatus 52 in which the grinding device 64 can change the shape of the grinding surface 154 of one or more of the grinding wheels 74 in the grinding head 140. For example, a grinding wheel 74 that initially has a grinding surface 154 adapted to perform a grinding action on an ice blade 10 to grind a ⅜ inch radius concave hollow into the ice contacting surface 16, may be changed so that it will instead grind a 1 inch radius concave hollow, a V-shaped hollow, a square-shaped hollow, or other-shaped hollow, including a convex-shaped hollow, and other custom or proprietary hollow shapes.

The automated apparatus 52, as shown in FIG. 4, includes a printer 158 in communication with the processor 56 and configured to print a report 160. As will be appreciated, the report 160 may include a summary of the user's session with the automated apparatus 52, a receipt for payment, an analysis of the ice blade 10 before and after performing the grinding action, including problems detected, tracking information (i.e. number of times the blade was sharpened on the automated apparatus 52 or other automated apparatuses in a network), estimated life remaining (i.e. estimated number of sharpenings and/or shapings that can still be performed on the ice blade 10 before the ice blade 10 will be out of tolerance), etc. As can be appreciated, the printer 158 may be configured to print a report including any information stored in the memory 102, the cloud 96, or cloud accessible servers 98, as well as secondary information derived from the stored information, for example results of analysis by the processor 56, and recommendations to the user based on such analysis, etc. The report may also be sent to the user via electronic message or medium such as e-mail or posted to the user's account.

The automated apparatus 52, as shown in FIG. 4, includes a payment device 162 in communication with the processor 56 and configured to receive user account identification information, or payment, from the user. The processor 56 may correlate the user account identification information to a user account maintained locally, for example in memory 102, or remotely in the cloud 96, or in a cloud accessible server 102. The processor 56 may then credit the user account, or require a payment from the user before proceeding with a particular user selected option. By way of example, the payment device 162 may be an optical card reader, a magnetic strip reader, a chip reader, a credit card reader, a near field communication (NFC) reader, or a currency validator and collector device. Thus, the payment device 162 may be of the type that receives and collects physical currency, as is known in the art. The payment device 162 may also be of the type that reads bank issued cards or other devices to process debit or credit card payment transactions, as is known in the art. The payment device 162 may also read and process pre-paid cards, account cards, discount cards, tokens, coupons, or the like, which may be issued by the operator of the automated apparatus 52, and which may or may not be linked to a user account 100. The payment device 162 may also be configured with a communication link 90 to the user's mobile device 92 permitting data to be sent by the payment device 162 and received by the mobile device 92, and vice versa, to enable the user to transmit account information, or make a payment to the payment device 162. Furthermore, the communication link 90 between the payment device 162 and the mobile device 92 may be indirect and involve servers in the cloud 96, or accessible through the cloud 98, as will be appreciated by persons skilled in the art. As mentioned above, the user accounts 100 may be contained in the cloud 96, in a cloud accessible server 102, and/or in the main server 108. In other embodiments, the automated apparatus 52 may include more than one payment device 162 to enable the automated apparatus 52 to provide a wide variety of payment options to the user.

Figure 14:
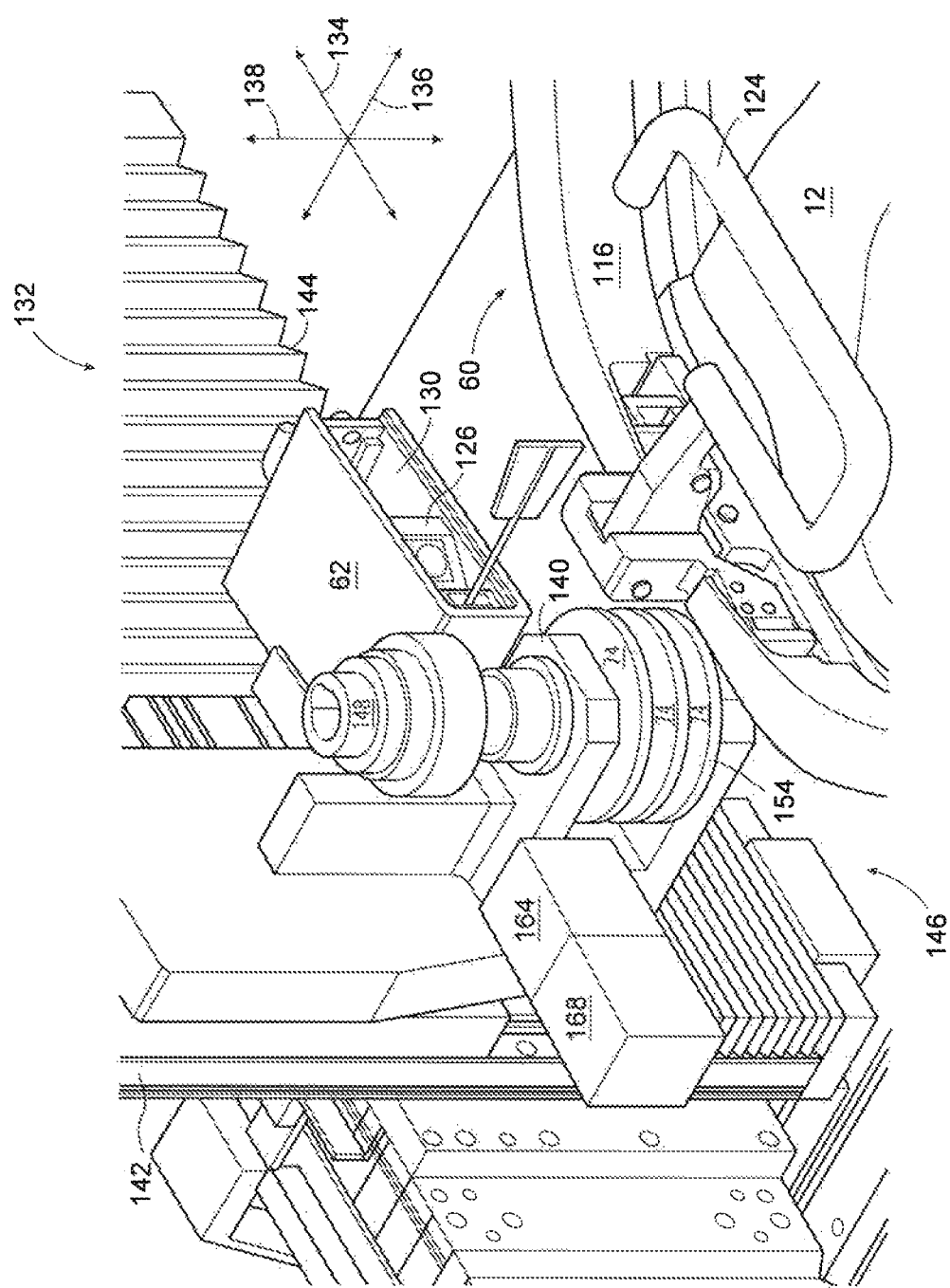
FIG. 14 shows an ice blade marking system, and a coating system, according to an embodiment of the present invention.

The automated apparatus 52 includes an ice blade marking system 164, shown in FIG. 14, adapted to mark the ice blade 10 when the ice skate 12 is held in the skate holder 60. The ice blade marking system 164 is attached to the carriage assembly 132 adjacent to the grinding device 64. The marking system 164 is in communication with, and controlled by, the processor 56. The marking system 164 may be configured to print a mark 166 on, adhere the mark on, or etch the mark into, the ice blade 10. For example, the marking system 164 may comprise an inkjet printer, or CO2 laser configured to print or etch, respectively, the surface of the side 50 of the ice blade 10 held in the holder 60. Accordingly, the mark 166 may be one or more of a symbol, a UPC code, a QR code, an alpha-numeric code, a bar code, an RFID tag, and the like. Furthermore, the marking system 164 may be further adapted to read the marks 166 on the ice blade 10. In this way, the marking system 164 may collect information on the particular ice blade 10 held in the skate holder 60, and the processor 56 may be configured to use the information to recommend an ice blade grinding option to the user. Furthermore, the processor 56 may associate the information collected by the ice blade marking system with a user account 100, and use the information to update historical data in a user profile 106.

Figure 13:
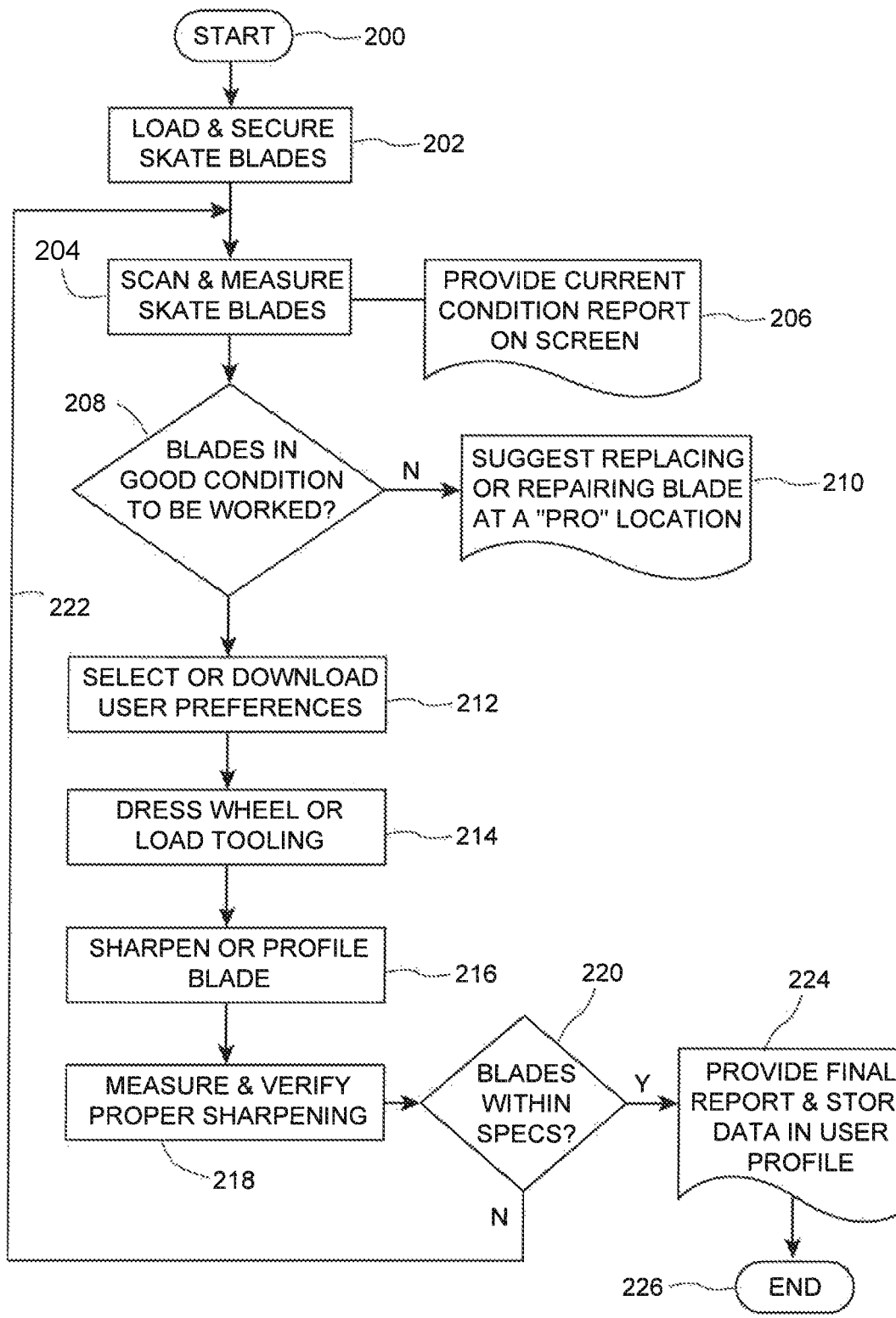
FIG. 13 is a flow chart showing a method of operation of the automated apparatus of FIG. 1, according to an embodiment of the present invention.

The automated apparatus 52 includes a coating system 168, shown in FIG. 14, in communication with the processor 56 adapted to apply a coating to the ice blade 10 held in the skate holder 60. The coating system 168 is attached to the carriage assembly 132 adjacent to the grinding device 64. Examples of coatings that may be applied to the ice blade 10 by the coating system 168 include a plastic coating, a wax coating, a ceramic coating, and a thin layer material coating. The coating system 168 may comprise a liquid reservoir and an applicator configured to apply the liquid from the reservoir to coat the surface of the side 50 of the ice blade 10 held in the holder 60. As another example, the coating system 168 may comprise a coating wheel (not shown) on the grinding head 140 in place of one of the grinding wheels 74, which is configured to hold a coating material, and release the coating material onto the ice blade 10 as when the grinding head 140 is moved by the carriage assembly 132 relative to the ice blade 10. The function of the automated apparatus 52 will now be described in greater detail with reference to FIG. 13.

The user begins at 200 by bringing an ice skate 12 to the automated apparatus 52. Next at 202, the user may place the ice skate 12 into the skate holder 60 and secure it by moving handle 124 to hold the skate 12 in the skate holder 60 in a fixed grinding position. Next at 204, the automated apparatus 52 may scan and measure the shape of the ice contacting surface 16 of the ice blade 10 on the ice skate 12. When the automated apparatus 52 finishes the scanning and measuring step 204, it may provide a current condition report on the display 84 and/or printer 158 at 206, and the automated apparatus 52 may proceed to make a determination at 208 on whether the ice blade 10 is in good condition, and suitable for performing a grinding action thereon.

If the determination is that the ice blade 10 is not suitable, the automated apparatus 52 may provide a suggestion on the display 84 that the user replace the ice blade 10, or repair the ice blade at 210. Otherwise, at 212, the automated apparatus 52 may allow the user to select an ice blade grinding option and/or download user preferences from a user profile 106. Next at 214, the automated apparatus 52 may dress the grinding wheel 74 of the grinding device 64, or load a rotary grinding tool into the grinding device 64. Next at 216 the grinding device 64 may perform a grinding action on the ice blade 10 based on the selected ice blade grinding option, to change the shape of the ice blade 10 to a desired shape 68. In this step, the measured shape 70 of the ice blade 10 may be compared to a desired shape 68 for the ice blade 10 to identify differences between the measured shape 70 and the desired shape 68. The ice blade 10 may then be sharpened to remove from the measured shape 70 the differences with the desired shape 68. Optionally, the grinding action step may involve determining which one of a plurality of grinding wheels 74 co-axially mounted in a grinding device 64 is suitable for performing the grinding action on the ice blade 10 to remove the difference. Performing the grinding action involves moving the grinding device 64 to contact the ice blade 10 with the determined grinding wheel 74 and performing the grinding action to remove the difference from the ice blade 10.

Next at 218, the automated apparatus 52 may scan and measure the shape of the ice blade 10 once more after the grinding action being performed by the grinding device 64. Then at 220 the automated apparatus 52 may proceed to make a determination of whether the shape of the ice blade 10 after the grinding operation matches the desired shape 68, or whether the difference is not greater than a predetermined acceptable value, meaning that the grinding action was successful. It the determination is that the grinding action was not successful, then at 222, the automated apparatus 52 may repeat steps 204 to 220. Otherwise, at 224, the automated apparatus may provide a final report on the display 84 and/or printer 158 and store data in the user profile 106. Operation of the automated apparatus 52 then ends at 226.

Although the measuring device 126 is described as a part of the automated apparatus 52, it will be understood that the measuring device 126 may be used independently of the automated apparatus 52, for example as a part of an independent ice blade measuring system. For example, the ice blade 10 may be measured on a dedicated ice blade measuring system, and a dataset which corresponds to the 3D shape of the ice blade 10 may be created, without the ice blade 10 being shaped or sharpened. Then, at a later time, the ice blade 10 may be shaped or sharpened on a separate ice blade grinding system, based on the measured dataset constructed by the aforesaid measuring system. However, the measuring system also be incorporated into automated ice blade grinding systems. All such embodiments of the measuring device 126 are comprehended by the present invention. By way of example only, an ice blade measuring system is described in more detail below.

Accordingly, the present invention may also provide a means for making a precise measurement of the physical dimensions of the bottom surface and side surfaces of the ice contacting surface 16 of the ice blade 10, which is recorded into a measured dataset. The measured dataset may be stored in a data storage means connected to the measurement means, such as for example memory 102. The measurements may be sufficiently accurate and sufficiently detailed to create an accurate 3D numerical representation of the ice contacting surface 16 of the ice blade 10. In one embodiment, the invention may include a laser measurement device, as shown in FIG. 8 as 126 with a scanner beam 128, which is able to read the ice contacting surface 16 of the ice blade 10 to within about 20 microns accuracy and, in some embodiments, to within about 1 to 10 microns accuracy. Such a measuring device 126 or 3D scanner can take measurements across the hollow 14 and all along the length of the ice contacting surface 16 of the ice blade 10. As will be understood, the accuracy of the measurement for the dataset is greater than, or equal to, the dimensional changes to the shape of the ice contacting surface 16 that are possible by the grinding action performed by the grinding device 64, for the present invention to provide adequate results.

Although the measuring device 126 is described as a part of the automated apparatus 52, it will be understood that the measuring device 126 may be used independently of the automated apparatus 52, for example as a part of an independent ice blade measuring system. For example, the ice blade 10 may be measured on a dedicated ice blade measuring system (i.e. having no means for shaping or sharpening the ice blade 10), and a dataset which corresponds to the 3D shape of the ice blade 10 may be created, without the ice blade 10 being shaped or sharpened. Then, at a later time, the ice blade 10 may be shaped or sharpened on a separate ice blade grinding system (i.e. having no means for measuring a 3D shape of the ice blade 10), based on the dataset created by the aforesaid measuring system. All such embodiments of the measuring device 126 are comprehended by the present invention.

The present invention may be provided in a first configuration, designated as the "arena" model, which may be typically operated directly by the end user via a kiosk type interface shown in FIG. 4. The present invention may also be provided in a second configuration, which may be typically operated by a trained skate sharpening technician and will vary in the options available to the technician for shaping and sharpening ice skates. The second configuration may range from a "pro" model to be used in specialty skate shops to a "club" model which may include more diagnostics options and ability to track athletes' biometrics associated to the ice skates to be used for high level applications such as professional and high performance hockey leagues. Other configurations of the invention incorporating the aforedescribed elements are also possible.

The table below summarizes the three most common, but non-limiting, embodiments of the invention:

| Feature | Arena | Pro | Club |
|---|---|---|---|
| OPERATION | | | |
| Ice skate sharpening | ✓ | ✓ | ✓ |
| Ice blade inspection, measurement and analysis | ✓ | ✓ | ✓ |
| Ice blade condition report to user | ✓ | ✓ | ✓ |
| Monitor live of components if apparatus & alert of need for maintenance | ✓ | ✓ | ✓ |
| Custom ice blade ID marking/engraving | Opt. | ✓ | ✓ |
| Custom ice blade shaping | | ✓ | ✓ |
| Operated by | User | Tech | Tech |
| INTERFACE | | | |
| Touchscreen/mobile device software application | ✓ | ✓ | ✓ |
| User profile & historical data | App only | ✓ | ✓ |
| Changing ice blade shape to last user settings | App only | ✓ | ✓ |
| Ability to customize hollow along length of ice blade | | ✓ | ✓ |
| Change ice blade shape to suit user preferences | | ✓ | ✓ |
| DATABASE | | | |
| Store user profile for record keeping | Cloud | Cloud | Cloud |
| User history and ice blade wear tracking | ✓ | ✓ | ✓ |
| Custom ice blade shaping based on wear history or biometrics | | ✓ | ✓ |
| Custom ice blade shaping based on performance history or biometrics | | | ✓ |
| User ice blade settings and performance tracking functions | App only | App only | ✓ |
| Sharing/Downloading custom ice blade shapes and model ice blade datasets | App only | App only | ✓ |
| Team ice blade settings and performance tracking functions | | | ✓ |

In other embodiments, the Arena model may have a machine add-on, such as a vending machine component that can dispense hockey tape, wax, laces, practice balls, pucks, tool kits (screws and screwdrivers for helmets, etc.) and other small items. Such a vending machine component may clip onto the side of the automated apparatus and be automatically integrated into the user account and payment systems. As would be understood by one with ordinary skill in the art, embodiments of the invention other than the three examples listed above are also possible and can include any combination of the elements described herein.

In the foregoing description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail. Finally, the operation of well-known components and/or processes has not been shown or described in detail below to avoid unnecessarily obscuring the present invention. Therefore, the present invention is to be limited only by the appended claims.

What is claimed is:

1. An automated apparatus for grinding an ice blade on an ice skate, said apparatus comprising:
    a processor;
    an input device in communication with said processor to permit a user to select an ice blade grinding option;
    a skate holder configured to releasably hold at least one said ice skate to said apparatus;
    a non-contact measuring device in communication with said processor, said non-contact measuring device being configured to measure a three-dimensional (3D) shape of said ice blade when said at least one ice skate is held by said skate holder; and
    a grinding device in communication with said processor, said grinding device being configured to perform a grinding action on said ice blade in said holder based on said selected ice blade grinding option to change said 3D shape of said ice blade to a desired 3D shape, said processor configured to determine whether said ice blade is unsuitable for said selected ice blade grinding option based on said measured 3D shape of said ice blade prior to said grinding device performing said grinding action on said ice blade.

2. The automated apparatus according to claim 1, wherein said grinding action removes material from said skate blade to change a shape of an ice contacting surface of said ice blade.

3. The automated apparatus according to claim 1, wherein said change to said ice contacting surface comprises changing one or more of a side shape at a toe section of said skate blade, a heel section of said ice blade, and a working section of said ice blade.

4. The automated apparatus according to claim 2, wherein said grinding action removes material from said ice blade to change a shape of said ice contacting surface in cross-section.

5. The automated apparatus according to claim 4, wherein said change to said ice contacting surface in cross-section comprises one or more of forming a hollow, changing a shape of an existing hollow, removing said existing hollow, and smoothing said existing concave hollow.

6. The automated apparatus according to claim 5, wherein said hollow is one or more of a concave-shaped hollow, a V-shaped hollow, a square-shaped hollow, a convex-shaped hollow, and a custom shaped hollow.

7. The automated apparatus according to claim 2, wherein said change to said ice contacting surface varies along a length of said ice blade.

8. The automated apparatus according to claim 1,
    wherein said ice blade has a left side surface, a right side surface, and an ice contacting surface, said left side surface and said ice contacting surface define a left blade edge, said right side surface and said ice contacting surface define a right blade edge; and
    wherein said grinding action removes material from at least a portion of said ice blade to raise one of said left blade edge and said right blade edge relative to the other of said left blade edge and said right blade edge, in said at least portion of said ice blade.

9. The automated apparatus according to claim 1, wherein said grinding action sharpens said ice blade.

10. The automated apparatus according to claim 1, wherein when said processor determines that said ice blade is unsuitable for said selected ice blade grinding option said processor causes said apparatus to alert said user, prior to said grinding device performing said grinding action.

11. The automated apparatus according to claim 10, wherein said ice blade is unsuitable for said selected ice blade grinding option if said ice blade is too warped, said ice blade is too worn, said ice blade lacks sufficient material for said grinding action to change said shape of said ice blade to said desired 3D shape, or said grinding action would result in said ice blade being out of manufacturer defined tolerance limits.

12. The automated apparatus according to claim 1, further comprising a memory in communication with said processor.

13. The automated apparatus according to claim 12, wherein said memory comprises at least one data set corresponding to a shape of at least a portion of a model ice blade.

14. The automated apparatus according to claim 13, wherein said model ice blade is based on an ice blade used by a professional hockey player, based on an ice blade used by a professional figure skater, or having a particular skating characteristic.

15. The automated apparatus according to claim 13, wherein said desired 3D shape is at least partly based on said at least one data set.

16. The automated apparatus according to claim 14, wherein said processor is configured to store a user profile in said memory, said user profile comprising historical data including one or more of said measured ice blade shapes, and said selected ice blade grinding options.

17. The automated apparatus according to claim 16, wherein said user profile further comprises at least one parameter of a skater associated with said at least one ice skate.

18. The automated apparatus according to claim 15, wherein said processor is configured to analyze said user profile to determine one or both of an ice blade wear pattern, and a skating style of a skater associated with said at least one ice skate.

19. The automated apparatus according to claim 18, wherein said desired 3D shape is at least partly based on said analysis.

20. The automated apparatus according to claim 16, wherein said user profile further comprises said selected ice blade grinding option for one of a matched pair of skates, and said desired shape for the other of said matched pair of skates is at least partly based on said historical data.

21. The automated apparatus according to claim 18, wherein said processor is further configured to use said analysis to determine if said selected ice blade grinding option is suitable, and if not, cause said apparatus to alert said user.

22. The automated apparatus according to claim 12, wherein said memory is located in said apparatus, or remote from said apparatus and accessible to said processor via a wired or wireless network.

23. The automated apparatus according to claim 1, wherein said non-contact measuring device is a laser scanner, a camera vision device, or an optical scanner.

24. The automated apparatus according to claim 1, further comprising a vacuum device in communication with said processor, said vacuum device being configured to capture and contain dust created when said grinding device performs said grinding action on said ice blade.

25. The automated apparatus according to claim 1, wherein said input device comprises a user interface having a display and one or more input devices engageable by said user.

26. The automated apparatus according to claim 25, wherein said input device is a button, a touch screen, a touch pad, a keyboard, a keypad, a trackball, a joystick, or a customer account.

27. The automated apparatus according to claim 1, further comprising a payment device in communication with said processor, said payment device being configured to receive account information, or payment, from said user.

28. The automated apparatus according to claim 27, wherein said payment device comprises an optical card reader, a magnetic strip reader, a chip reader, a credit card reader, a near field communication (NFC) reader, or a currency validator and collector device.

29. The automated apparatus according to claim 28, wherein said payment device comprises a communication link to a local or remote account information or payment processing system.

30. The automated apparatus according to claim 1, wherein said input device comprises a communication link to a mobile device of said user, and said mobile device contains a software application configured to provide a user interface having a display and one or more input devices engageable by said user.

31. The automated apparatus according to claim 30, wherein said software application is further configured to receive payment from said user via said user interface.

32. The automated apparatus according to claim 1, further comprising a printer in communication with said processor, said printer being configured to print a report.

33. The automated apparatus according to claim 1, wherein said skate holder comprises a body having a first skate contacting surface, and a second skate contacting surface, wherein one of said first skate contacting surface and said second skate contacting surface is movable toward the other of said first skate contacting surface and said second skate contacting surface to permit said skate to be clamped between said first skate contacting surface and said second skate contacting surface.

34. The automated apparatus according to claim 33, wherein said first skate contacting surface or said second skate contacting surface is fixed in position.

35. The automated apparatus according to claim 34, wherein said first skate contacting surface is movable towards said second skate contacting surface, and said first and second skate contacting surfaces move towards each other at the same rate so that said ice blade is automatically centered in said body.

36. The automated apparatus according to claim 34, wherein said body further comprises a means to move said first skate contacting surface or said second skate contacting surface.

37. The automated apparatus according to claim 36, wherein said moving means is a cam and handle arrangement manually operable by said user.

38. The automated apparatus according to claim 36, wherein said moving means is an actuator controlled by said processor.

39. The automated apparatus according to claim 1, wherein said skate holder is configured to releasably hold a pair of skates in fixed grinding positions.

40. The automated apparatus according to claim 1, wherein said apparatus is configured to provide at least two-dimensional movement between said ice blade grinding device and said ice blade in said holder to permit said grinding device to contact and perform said grinding action on said ice blade.

41. The automated apparatus according to claim 40, wherein one of said at least two dimensions is defined by a first axis generally parallel to a longitudinal axis of said ice blade, and the other of said at least two dimensions is defined by a second axis generally perpendicular to said first axis and oriented in a plane parallel to a side surface of said ice blade.

42. The automated apparatus according to claim 40, wherein said apparatus is configured to provide at least three-dimensional movement between said ice blade grinding device and said ice blade in said holder to permit said grinder to contact and perform said grinding action on said ice blade.

43. The automated apparatus according to claim 40, wherein one or both of said ice blade in said holder and said grinding device move relative to one another.

44. The automated apparatus according to claim 40, wherein said ice blade in said holder is held in a fixed potion and said grinding device moves relative to said ice blade to perform said grinding action on said ice blade.

45. The automated apparatus according to claim 40, wherein said grinding device is held in a fixed position and said ice blade in said holder moves relative to said grinding device to perform said grinding action on said ice blade.

46. The automated apparatus according to claim 40, wherein said movement of said grinding device is computer numerically controlled by said processor.

47. The automated apparatus according to claim 1, wherein after said grinding device performs said grinding action on said ice blade, said processor is configured to:
  cause said 3D measuring device to re-measure said 3D shape of said ice blade in said holder; and
  calculate a difference between said re-measured 3D shape and said desired 3D shape; and
  cause said apparatus to alert said user if said difference is greater than a predetermined acceptable value.

48. The automated apparatus according to claim 1, in the form of a self-serve kiosk.

49. The automated apparatus according to claim 1, further comprising an ice blade marking system in communication with said processor to mark said ice blade.

50. The automated apparatus according to claim 49, wherein said mark is printed on, adhered on, or etched into, said ice blade.

51. The automated apparatus according to claim 49, wherein said ice blade marking system is further adapted to read said mark on said ice blade.

52. The automated apparatus according to claim 49, wherein said mark is selected from the group consisting of symbols, UPC codes, QR codes, alpha-numeric codes, bar codes, and RFID tags.

53. The automated apparatus according to claim 1, further comprising a coating system in communication with said processor to apply a coating to said ice blade.

54. The automated apparatus according to claim 53, wherein said coating is a plastic coating, a ceramic coating, or a thin layer material coating.

55. The automated apparatus according to claim 1, wherein said grinding device comprises a grinding surface, said automated apparatus further comprising a means to dress or shape said grinding surface, or select from a plurality of predefined grinding surfaces.

* * * * *